United States Patent
Witt-Sanson et al.

(10) Patent No.: US 12,319,831 B2
(45) Date of Patent: Jun. 3, 2025

(54) COATING COMPOSITION

(71) Applicant: PPG Industries Ohio, Inc., Cleveland, OH (US)

(72) Inventors: Christelle Witt-Sanson, Ofterdingen (DE); Grzegorz Kondziolka, Zebrzydowice (PL)

(73) Assignee: PPG Industries Ohio, Inc., Cleveland, OH (US)

( * ) Notice: Subject to any disclaimer, the term of this patent is extended or adjusted under 35 U.S.C. 154(b) by 556 days.

(21) Appl. No.: 16/477,657

(22) PCT Filed: Jan. 15, 2018

(86) PCT No.: PCT/US2018/013718
§ 371 (c)(1),
(2) Date: Jul. 12, 2019

(87) PCT Pub. No.: WO2018/132792
PCT Pub. Date: Jul. 19, 2018

(65) Prior Publication Data
US 2020/0377758 A1     Dec. 3, 2020

(30) Foreign Application Priority Data

Jan. 13, 2017 (EP) .................................. 17151470

(51) Int. Cl.
| | |
|---|---|
| *C09D 179/08* | (2006.01) |
| *C08G 73/16* | (2006.01) |
| *C08K 5/00* | (2006.01) |
| *C08K 5/092* | (2006.01) |
| *C08K 5/20* | (2006.01) |
| *C08K 5/21* | (2006.01) |
| *C08K 5/56* | (2006.01) |
| *C09D 5/03* | (2006.01) |

(52) U.S. Cl.
CPC ........... *C09D 179/08* (2013.01); *C08G 73/16* (2013.01); *C08K 5/0025* (2013.01); *C08K 5/092* (2013.01); *C08K 5/20* (2013.01); *C08K 5/21* (2013.01); *C08K 5/56* (2013.01); *C09D 5/03* (2013.01); *C08G 2150/20* (2013.01); *C08G 2390/00* (2013.01)

(58) Field of Classification Search
None
See application file for complete search history.

(56) References Cited

U.S. PATENT DOCUMENTS

| | | | | |
|---|---|---|---|---|
| 4,076,917 | A * | 2/1978 | Swift | C08L 35/00 |
| | | | | 525/329.5 |
| 4,119,608 | A * | 10/1978 | Keating | C08G 73/16 |
| | | | | 528/188 |
| 4,180,612 | A | 12/1979 | Pauze et al. | |
| 4,716,079 | A * | 12/1987 | Sano | C10M 147/02 |
| | | | | 428/383 |
| 4,861,861 | A | 8/1989 | Gabutti | |
| 6,165,557 | A | 12/2000 | Blum et al. | |
| 2004/0063852 | A1 | 4/2004 | Wamprecht et al. | |
| 2008/0081196 | A1 * | 4/2008 | Saito | C09D 5/084 |
| | | | | 428/425.8 |

FOREIGN PATENT DOCUMENTS

| | | | |
|---|---|---|---|
| EP | 322610 A * | 7/1989 | |
| EP | 2746353 A1 | 6/2014 | |
| EP | 3348622 * | 7/2018 | |
| JP | 354078794 A * | 6/1979 | |
| KR | 1993-0008024 | 5/1993 | |
| KR | 20050019093 A | 2/2005 | |
| RU | 2449892 C2 | 5/2012 | |
| WO | 2008/135209 A1 | 11/2008 | |
| WO | 2013067388 A1 | 5/2013 | |
| WO | 2014/096088 A | 6/2014 | |

* cited by examiner

*Primary Examiner* — Tae H Yoon
(74) *Attorney, Agent, or Firm* — Diane Meyers; Rebeca Himena Miller

(57) ABSTRACT

A coating composition comprising: a. a polyester imide (PEI) polymer having an acid value of ≥10 mg KOH/g; and b. a crosslinker operable to crosslink the acid functionality on the polyester imide polymer wherein the coating composition is substantially free of bisphenol A (BPA), bisphenol F (BPF), bisphenol A diglycidyl ether (BADGE) and bisphenol F diglycidyl ether (BFDGE).

24 Claims, No Drawings

COATING COMPOSITION

CROSS-REFERENCE TO RELATED APPLICATIONS

This application is a national phase filing of International Patent Application No. PCT/US2018/013718, filed Jan. 15, 2018, which claims priority to European Patent Application No. 17151470.6, filed Jan. 13, 2017, the disclosures of which are hereby incorporated in their entireties by reference.

FIELD

The present invention relates to a coating composition comprising a polyester imide resin. In particular, the present invention relates to coating compositions containing a polyester imide resin for coating onto a metal substrate, particularly onto a metal substrate for the packaging industry, such as coating onto food and/or beverage containers or aerosol cans. Such coatings may include liquid or powder coatings, such as thermoset powder coatings, for example. The invention also extends to metal substrates coated on at least of portion thereof with such coating compositions and items of packaging such as cans, tubes etc having said coating on at least a portion thereof.

BACKGROUND

The surfaces of containers, such as food and/or beverage containers, containers for personal care products or aerosol containers are required to be coated for various reasons. The external surfaces of such containers are often coated in a decorative manner and may allow printing thereon to inform a user as to the contents of the container. The internal surfaces of such container are typically coated to protect the container from the contents therein, which in some instances may be chemically aggressive. The coating on the container should also protect the contents from the container. There should be a minimal amount of alteration to the contents from materials that are products of erosion of the container, or from the coating itself. Accordingly, the coating composition used to coat the internal surfaces of the container should be designed such that it is able to withstand contact with these aggressive chemicals and to minimise the release of material from the metal of the container or the coating layer into the contents of the container.

A wide variety of coatings have been used to coat containers. With regard to food and/or beverage containers, the coating compositions are required to have certain properties such as being capable of high speed application, having excellent adhesion to the substrate, being safe for food contact and having properties once cured that are suitable for their end use.

Containers used for the storage of aerosols (aerosol cans, for example), such as personal healthcare aerosols, or industrial use aerosols, are typically formed from a tube, for example, an aluminium tube. One such tube type is a monobloc aerosol, which is so called because it is formed from a single piece (a small disc known as a "slug") of aluminium. Such aluminium tubes can also be formed into bottle shapes, so called "monobloc bottles" and used for beer and other beverages, for example. Coating compositions known in the art and used to coat such cans, particularly an internal portion thereof, include polyamide imide, which is made in N-methyl pyrrolidone. However, N-methyl pyrrolidone has recently been reclassified as toxic to reproduction and development (reprotoxic) and also listed as having specific organ toxicity for the respiratory tract and thus its use is not desirable.

Furthermore, many of the coating compositions currently used for food and/or beverage or aerosol applications contain epoxy resins. Such epoxy resins are typically formed from polyglycidyl ethers of bisphenol A (BPA). BPA is perceived as being harmful to human health and it is therefore desirable to eliminate it from coatings. Derivatives of BPA such as diglycidyl ethers of bisphenol A (BADGE), epoxy novolak resins and polyols prepared from BPA and bisphenol F (BPF) are also viewed as problematic.

It is an object of aspects of the present invention to provide a solution to one or more of the above mentioned or other problems.

SUMMARY

According to a first aspect of the present invention there is provided a coating composition comprising:
a. a polyester imide (PEI) polymer having an acid value of ≥10 mg KOH/g; and
b. a crosslinker operable to crosslink the acid functionality on the polyester imide polymer wherein the coating composition is substantially free of bisphenol A (BPA), bisphenol F (BPF), bisphenol A diglycidyl ether (BADGE) and bisphenol F diglycidyl ether (BFDGE).

Typically, the PEI polymer comprises a polyester linkage and an imide in the backbone of the polymer.

Suitably, the PEI polymer is formed from an imide containing moiety. The imide containing moiety may also comprise an acid group and/or an alcohol group. The imide containing moiety may contain at least two acid groups, at least two alcohol groups or at least one acid group and at least one alcohol group.

The imide containing moiety may contain a cyclic imide group.

The imide containing moiety may be formed as a reaction product between a primary amine or an isocyanate with a cyclic anhydride. For example, typical components in such a reaction may include a difunctional isocyanate such as methylene di-phenyl di-isocyanate, with an anhydride such as trimellitic anhydride.

For example, such a reaction is shown in Scheme I, below.

Scheme I

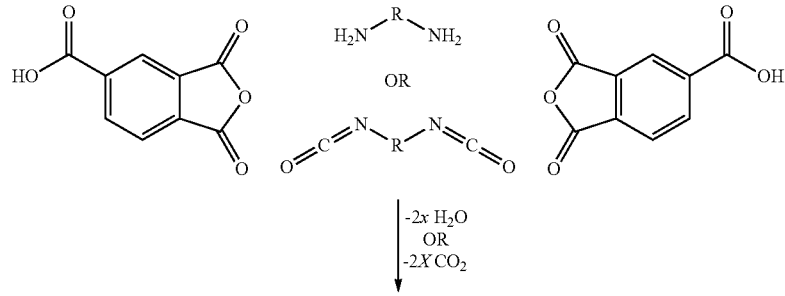

-continued

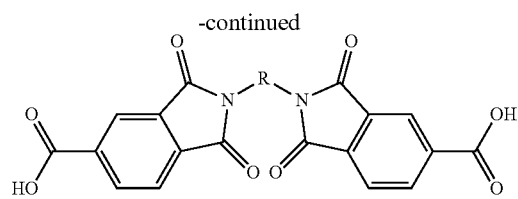

As can be seen from the above reaction scheme, the formed imide containing moiety may be a di-acid substituted imide, which may then be reacted with a diol (ethylene glycol, for example) in a polyesterification reaction to thereby form an imide containing polyester (polyester imide).

An alternative example of forming an imide containing moiety is shown in scheme 2, below. Scheme 2 shows the reaction of trimellitic anhydride with bis (4-isocyanatocyclohexyl) methane to form a di-imide di-acid.

Scheme 2

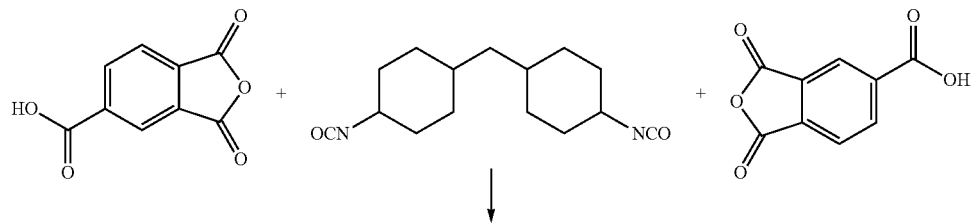

↓

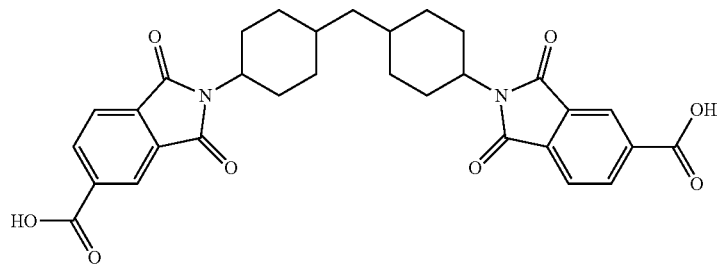

In a further example, a reaction leading to the formation of an imide containing moiety which is monoacid, mono hydroxyl substituted is shown in scheme 3, below. In this example a primary amine with additional hydroxyl functionality, mono ethanol amine, reacts with trimellitic anhydride to produce a cyclic imide with hydroxyl and acid functionality. The mono imide product shown in scheme 3 may then react with other diols, polyols and diacids in a polyesterification reaction to thereby form an imide containing polyester (polyester imide).

Alternatively or additionally, the reaction product in Scheme 3 may self condense in a polyesterification reaction.

Scheme 3

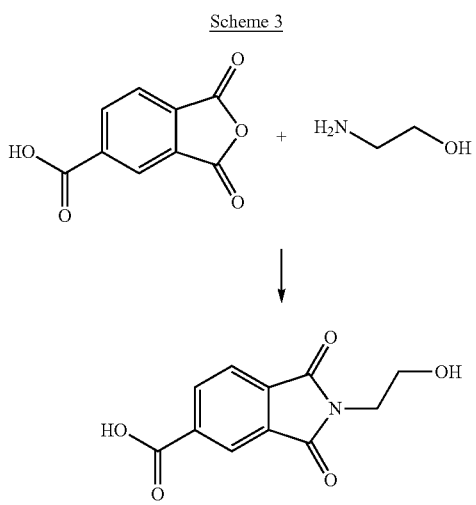

Examples of suitable amines that could be used include diamines such as, for example, ethylene diamine; 1,3-propane diamine; tetramethylene diamine; 1,6-hexane diamine; trimethyl hexane-1,6-diamine; isophrone diamine diaminodiphenylmethane (methylene dianaline); diaminodiphenylether; diaminodiphenylsulphone; methylene-4 4'-cyclohexyl diamine; benzoguanamine; ortho-xylylene diamine; meta-xylylene diamine; para-xylylenediamine; 1,2-cyclohexanediamine; 1,4-cyclohexanediamine; amines can also include hydroxyamines such as monoethanol amine; monopropanolamine; or aminocarboxylic acids such as glycine; aminopropionic acids or amino benzoic acids; and combinations thereof.

Examples of suitable isocyanates include, for example, hexamethylene di-isocyanate; tetramethylene di-isocyanate; isophorone di-isocyanate; methylene-4,4'-bis (cyclohexyl isocyanate) or bis-(4-isocyanatocyclohexyl)methane; methylene di phenyl di-isocyanate or bis-(4-isocyanatophenyl) methane; tetramethyl-meta-xylylene di-isocyanate; meta xylylene di-isocyanate; para xylylene di-isocyanate; cyclohexane di-isocyanate; naphthalene di-isocyanate; trimethyl hexamethylene di-isocyanate; and combinations thereof.

Examples of suitable cyclic anhydrides include trimellitic anhydride; pyromellitic di-anhydride; maleic anhydride; 3,3',4,4'-benzophenonetetracarboxylic dianhydride; tetrahydrophthalic anhydride; 1,4,5,-naphthalenetricarboxylic anhydride; 1,4,5,8-Naphthalenetetracarboxylic dianhydride; hemimellitic anhydride; and combinations thereof.

The imide containing moiety may be formed generally in the absence of diol or polyol (ie. less than 1% by weight diol or polyol, suitably, less than 0.5% by weight, more suitably less than 0.1% by weight, such as less than 0.05% by weight or less than 0.01% by weight). The imide containing moiety may be formed in the absence of diol or polyol.

The imide containing moiety may be formed in the presence of a diol or polyol.

The polyester imide polymer is suitably formed by reaction of an imide containing moiety with a diol, polyol (or other primarily hydroxy functional branching monomer), dicarboxylic acid, diester or a component containing one acid (or ester) and one alcohol group, as the case may be (depending on the functionality of the imide) to thereby form a polyester.

"Polyol" and like terms, as used herein, refers to a compound having two or more hydroxyl groups, such as two, three or four hydroxyl groups. The hydroxyl groups of the polyol may be connected by a bridging group selected from: an alkylene group; an alkenylene group; an alkynylene group; or an arylene group. Suitably the polyol is an organic polyol.

"Diol" and like terms, as used herein, refers to a compound having two hydroxyl groups. The hydroxyl groups of the diol may be connected by a bridging group selected from: an alkylene group; an alkenylene group; an alkynylene group; or an arylene group. Suitably the diol is an organic polyol.

Examples of suitable diols include, but are not limited to, the following: ethylene glycol; 1,2-propane diol; 1,3-propane diol; 1,2-butanediol; 1,3-butandiol; 1,4-butanediol; 2,3-butane diol; 2-methyl-1,3-propane diol; 2,2'-dimethyl-1,3-propanediol; 1,5-pentane diol; 3-methyl-1,5-pentanediol; 1,6-hexane diol; diethylene glycol; triethylene glycol; dipropylene glycol; tripropylene glycol; 2,2,4-trimethyl pentane-1,3-diol; 1,4-cyclohexane dimethanol; tricyclodecane dimethanol; 2,2,4,4-tetramethyl cyclobutane-1,3-diol; isosorbide; 1,4-cyclohexane diol; 1,1'-isopropylidene-bis-(4-cyclohexanol); and combinations thereof.

Examples of suitable polyols (or other, primarily hydroxy, functional branching monomer) include, but are not limited to, the following: tris (hydroxyethyl)isocyanurate; trimethylol propane; trimethylol ethane; 1,2,6-hexane triol; pentaerythritol; erythritol; di-trimethylol propane; di-pentaerythritol; N,N,N',N'-tetra (hydroxyethyl)adipindiamide; N,N,N',N'-tetra (hydroxypropyl)adipindiamide; tri(hydroxy ethyl) amine; hexahydro-1,3,5-tris(hydroxyethyl)-s-triazine; N,N,N',N'-tetrakis-(hydroxyethyl)ethylenediamine; di ethanol amine; or combinations thereof.

"Diacid" and like terms as used herein, refers to a compound having two carboxylic acid groups and includes an ester of the diacid (wherein an acid group is esterified) or an anhydride. The diacid is suitably an organic polyacid.

Suitably, the carboxylic acid groups of the diacid may be connected by a bridging group selected from: an alkylene group; an alkenylene group; an alkynylene group; or an arylene group.

Examples of suitable diacids include, but are not limited to, the following: isophthalic acid; terephthalic acid; 1,4-cyclohexane dicarboxylic acid; succinic acid; adipic acid; azelaic acid; sebacic acid; fumaric acid; 2,6-naphthalene dicarboxylic acid; orthophthalic acid. Diacids can also be used in the form of the diester materials, such as: dimethyl ester derivatives such as dimethyl isophthalate; dimethyl terephthalate; dimethyl-1,4-cyclohexane dicarboxylate; dimethyl-2,6-naphthalene dicarboxylate; dimethyl fumarate; dimethyl orthophthalate; dimethylsuccinate; dimethyl glutarate; dimethyl adipate; or combinations thereof.

The term "alk" or "alkyl", as used herein unless otherwise defined, relates to saturated hydrocarbon radicals being straight, branched, cyclic or polycyclic moieties or combinations thereof and contain 1 to 20 carbon atoms, suitably 1 to 10 carbon atoms, more suitably 1 to 8 carbon atoms, still more suitably 1 to 6 carbon atoms, yet more suitably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —CH$_3$, becomes methylene, —CH$_2$—, when represented as an alkylene. Other alkylene groups should be understood accordingly.

The term "alkenyl", as used herein, relates to hydrocarbon radicals having, suitably up to 4, double bonds, being straight, branched, cyclic or polycyclic moieties or combinations thereof and containing from 2 to 18 carbon atoms, suitably 2 to 10 carbon atoms, more suitably from 2 to 8 carbon atoms, still more suitably 2 to 6 carbon atoms, yet more suitably 2 to 4 carbon atoms. These radicals may be optionally substituted with a hydroxyl, chloro, bromo, iodo, cyano, nitro, OR$^{19}$, OC(O)R$^{20}$, C(O)R$^{21}$, C(O)OR$^{22}$, NR$^{23}$R$^{24}$, C(O)NR$^{25}$R$^{26}$, SR$^{27}$, C(O)SR$^{27}$, C(S)NR$^{25}$R$^{26}$, or aryl, wherein R$^{19}$ to R$^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=CH2, becomes ethenylene, —CH=CH—, when represented as an alkenylene. Other alkenylene groups should be understood accordingly.

The term "alkynyl", as used herein, relates to hydrocarbon radicals having, suitably up to 4, triple bonds, being straight, branched, cyclic or polycyclic moieties or combinations thereof and having from 2 to 18 carbon atoms, suitably 2 to 10 carbon atoms, more suitably from 2 to 8 carbon atoms, still more suitably from 2 to 6 carbon atoms, yet more suitably 2 to 4 carbon atoms. These radicals may be optionally substituted with a hydroxy, chloro, bromo, iodo, cyano, nitro, OR$^{19}$, OC(O)R$^{20}$, C(O)R$^{21}$, C(O)OR$^{22}$, NR$^{23}$R$^{24}$, C(O)NR$^{25}$R$^{26}$, SR$^{27}$, C(O)SR$^{27}$, C(S)NR$^{25}$R$^{26}$, or aryl, wherein R$^{19}$ to R$^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, OR$^{19}$, OC(O)R$^{20}$, C(O)R$^{21}$, C(O)OR$^{22}$, NR$^{23}$R$^{24}$, C(O)NR$^{25}$R$^{26}$, SR$^{27}$, C(O)SR$^{27}$, C(S)NR$^{25}$R$^{26}$, or aryl, wherein R$^{19}$ to R$^{27}$ each independently represent hydrogen, aryl or lower alkyl, and/or be interrupted by oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as —Ph, becomes phenylene, —Ph—, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to, for example, "a" polyester imide polymer, "a" crosslinker, "an" imide, "the" residue of "an", and the like. As used herein, the term "polymer" refers to oligomers and both homopolymers and copolymers, and the prefix "poly" refers to two or more. Including, for example and like terms means including for example but not limited to.

The formation of the polyester imide polymer (the polyesterification) may take place in the presence of a catalyst. Suitable catalysts include: tetra n-butyl titanate; tetra isopropyl titanate; tetra ethyl hexyl titanate; zinc acetate; di butyl tin oxide; butyl stannoic acid; or combinations thereof.

The polyester imide polymer may be formed by first reacting a cyclic anhydride component with an amine or isocyanate component at a suitable temperature to produce a cyclic imide with reactive functionality in a first stage reaction (imide preparation reaction), which may be undertaken in the presence of a promoter/catalyst. However, in some cases catalysis may not be required. In a second stage reaction (polyesterification reaction) the other components diols, polyols and diacid or ester derivatives as the case may be (depending on the functionality of the imide) may be added to the product of the first stage reaction, together with appropriate catalysts (where required).

The amount of diol and polyol present in the polyesterification reaction may be sufficient to provide an excess of hydroxyl functionality in the formation which may initially provide a predominant hydroxyl functionality in the polyester imide polymer. The polyesterification reaction is suitably carried out at sufficient temperature to allow for removal of water or alcohol (particularly methanol) by-product as the polymer is formed. The polyesterification reaction progress may be monitored by appropriate methods including: amount of distillate released, acid value of the polymer (measured in units of mg KOH/g) or viscosity (melt viscosity or solution viscosity) of the polymer. The polyester imide polymer may have functional end groups including hydroxyl groups, acid groups or ester groups from mono alcohols.

The polyester imide polymer may be formed by first reacting a cyclic anhydride component with an amine or isocyanate component in the presence of some or all of the diol component at a suitable temperature to produce the cyclic imide with reactive functionality. In such a first stage reaction, a promoter and/or catalyst may be added. However, in some cases catalysis may not be required.

In a second stage the other components of the polyester imide, including any remaining diols, polyols and diacid or ester derivatives may be added together with appropriate catalysts. The amount of diol and polyol added may be sufficient to provide an excess of hydroxyl functionality which provides a predominant hydroxyl functionality in the polyester imide polymer.

Suitably, the second stage reaction is carried out at sufficient temperature to allow for removal of water or alcohol (particularly methanol) by-product, as the polymer is formed. The second stage reaction progress may be monitored by appropriate methods including amount of distillate released, acid and/or hydroxyl value of the polymer (measured in units of mg KOH/g) or viscosity (melt viscosity or solution viscosity) of the polymer. The polyester imide polymer has functional end groups including hydroxyl groups, acid groups or ester groups from monoalcohols.

The polyester imide polymer may be formed by first reacting diols, polyols and diacid or ester derivatives (a polyesterification reaction) which may be undertaken in the presence of a promoter and/or catalyst. However, in some cases catalysts may not be required. In a second stage reaction a cyclic anhydride component and an amine component (or possibly an isocyanate component) are added and the subsequent reaction is conducted at a suitable temperature to produce a cyclic imide with reactive functionality which further reacts with the polyester oligomers formed in a first stage reaction (polyesterification reaction). Appropriate catalysts and/or reaction promoters can be added as required, however, in some cases catalysts may not be required.

The amount of diol and polyol present in the polyesterificaiton reaction may be sufficient to provide an excess of hydroxyl functionality, which may provide the predominant hydroxyl functionality in the polymer. The polyesterification reaction is suitably carried out at sufficient temperature to allow for removal of water or alcohol (particularly methanol) by-product as the polymer is formed. The polyesterification reaction progress, in stage 1, and the imide formation and reaction, in stage 2, may be monitored by appropriate methods including: amount of distillate released, acid value of the polymer (measured in units of mgKOH/gm) or viscosity (melt viscosity or solution viscosity) of the polymer. The polyester imide polymer may have functional end groups including hydroxyl groups, acid groups or ester groups from mono alcohols.

The polyester imide polymer has an acid value of ≥10 mg KOH/g. The polyester imide polymer may be formed by contacting a polyester imide (formed as described above, for example) with an acidifying component. The acidifying component may be selected from an acid, a diacid, a polyacid anhydrides thereof, or mixtures thereof. Examples of suitable acidifying components include, but are not limited to, the following: isophthalic acid; terephthalic acid; 1,4-cyclohexane dicarboxylic acid; succinic acid; adipic acid; azelaic acid; sebacic acid; fumaric acid; 2,6-naphthalene dicarboxylic acid; orthophthalic acid,; trimellitic anhydride, succinic anhydride; maleic anhydride; tetrahydrophthalic anhydride or combinations thereof.

The polyester imide polymer may comprise at least 1 wt % of imide based on the total weight of the components, suitably, in the backbone thereof. The polyester imide polymer may comprise at least 2 wt %, suitably at least 3 wt % of imide based on the total weight of the components, suitably in the backbone thereof.

The polyester imide polymer may comprise less than 50 wt %, suitably less than 30 wt % imide based on the total weight of the components, suitably in the backbone thereof. The polyester imide polymer may comprise less than 25 wt %, suitably less than 20 wt % imide based on the total weight of the components, suitably in the backbone thereof.

The polyester imide polymer may comprise between 2 and 20 wt %, such as between 4 and 18 wt % imide based on the total weight of the components, suitably in the backbone thereof.

In referring to a percentage of imide present in the polyester imide polymer, based on the total weight of the components, it is meant the following. The polyester imide polymers contain imide units made up of the chemical structural unit $[-N(C=O)_2-]$, which has an atomic mass of 70 gmol$^{-1}$. In order to get some quantification of weight of the polymer components which can theoretically form imide a calculation can be used to determine the percentage weight of imide by weight of components. The calculation is shown below:

$$[\text{mols of imide used (or mols of components that form the imide, such as the cyclic anhydride)} \times 70 \times 100]/[\text{sum total weight of polymer components}]$$

The proportion of imide formed in the polyester imide polymers of the invention can also be characterised by reference to the molar proportions of the components. In particular, we can refer to the ratio of molar amount of imide forming groups to the molar amount of ester forming groups (the molar amount of carboxylic acid or their equivalents such as the amount of methyl esters). This can then be used to calculate a % imide equivalent, as per the calculation below:

$$[\text{mols of imide forming group (or cyclic anhydride)} \times 100]/[(\text{mols of imide forming group})+(\text{mols of ester forming group})]$$

The polyester imide polymer may have a percentage imide equivalent value of at least 5%, suitably at least 10%, such as at least 15%.

The polyester imide polymer may have a percentage imide equivalent value of less than 60%, suitably less than 50%, such as, for example, less than 45%.

The polyester imide polymer may have a percentage imide equivalent value of between 5 and 50%, suitably between 13 and 45%, such as, for example, between 18 and 41%.

The polyester imide polymer may have any suitable acid value (or acid number (AN)). The polyester imide polymer may have an acid value from 10 to 150 mg KOH/g, suitably as from 15 to 100 mg KOH/g, such as from 18 to 75 mg KOH/g, or from 20 to 50 mg KOH/g or 22 to 40 mg KOH/g.

The polyester imide polymer has an acid value of at least 10 mg KOH/g. The polyester imide polymer may have an acid value of at least 15 mg KOH/g, such as at least 18 mg KOH/g, or at least 20 or 22 mg KOH/g. The polyester imide polymer may have an acid value of up to 150 mg KOH/g, suitably up to 120 mg KOH/g, such as up to 100 mg KOH/g, or up to 90 or 80 mg KOH/g. The polyester imide polymer may have an acid value from 15 to 150 mg KOH/g, such as from 18 to 120 mg KOH/g, or from 20 to 120 mg KOH/g or 22 to 120 mg KOH/g. The polyester imide polymer may have an acid value from 10 to 100 mg KOH/g, suitably from 15 to 100 mg KOH/g, such as from 18 to 100 mg KOH/g, or from 20 to 100 mg KOH/g or 22 to 100 mg KOH/g.

The polyester imide polymer may have an acid value from 10 to 90 mg KOH/g, suitably from 15 to 90 mg KOH/g, such as from 18 to 90 mg KOH/g, or from 20 to 90 mg KOH/g or from 22 to 90 mg KOH/g Suitably, the acid value is expressed on solids.

The acid value is determined by titration with 0.1N methanolic potassium hydroxide solution. The sample of polymer (0.1-3 grams depending on acid value) is weighed accurately (on a balance with accuracy to weigh in milligrams) into a conical flask and is then dissolved in 25 millilitres of a solvent mixture containing Dichloromethane and Ethanol (3/1 w/w) and a few drops of 0.1% solution Bromo thymol blue indicator; using light heating and stirring as appropriate. The solution is then cooled to room temperature (20-30° C.) and the solution titrated with the potassium hydroxide solution. The resulting acid value (acid number) is expressed in units of mg KOH/g and is calculated using the following equation Acid Value=(titre KOH solution (mls)×Molarity KOH solution×56.1)/Weight of solid sample (grams)

The polyester imide polymer may have any suitable hydroxyl value (OHV). The polyester imide polymer may have hydroxyl value from 10 to 300 mg KOH/g, or 50 to 200 mg KOH/g, or 100 to 180 mg KOH/g.

Suitably, the hydroxyl value (OHV) is expressed on solids.

The gross hydroxyl value (OHV) may be measured by any suitable method. Methods to measure OHV will be well known to a person skilled in the art. Suitably, the hydroxyl value is the number of mg of KOH equivalent to the hydroxyl groups in 1 g of material. In such as method, suitably, a sample (typically, 0.1 to 3 g) is weighed accurately into a conical flask and is dissolved, using light heating and stirring as appropriate, in 20 ml of tetrahydrofuran. 10 ml of 0.1M 4-(dimethylamino)pyridine in tetrahydrofuran (catalyst solution) and 5 ml of a 9 vol % solution of acetic anhydride in tetrahydrofuran (i.e. 90 ml acetic anhydride in 910 ml tetrahydrofuran; acetylating solution) are then added to the mixture. After 5 minutes, 10 ml of an 80 vol % solution of tetrahydrofuran (i.e. 4 volume parts tetrahydrofuran to 1 part distilled water; hydrolysis solution) us added. After 15 minutes, 10 ml tetrahydrofuran is added and the solution is titrated with 0.5M ethanolic potassium hydroxide (KOH). A blank sample is also run where the sample of solid polyester is omitted. The resulting hydroxyl number is expressed in units of mg KOH/g and is calculated using the following equation:

$$\text{Hydroxyl value} = \frac{(V_2 - V_1) \times \text{molarity of } KOH \text{ solution (M)} \times 56.1}{\text{weight of solid sample (g)}}$$

wherein $V_1$ is the titre of KOH solution (ml) of the polyester sample and $V_2$ is the titre of KOH solution (ml) of the blank sample. All values for gross hydroxyl value (OHV) reported herein were measured this way.

The polyester imide polymer may have any suitable number-average molecular weight (Mn). The polyester imide polymer may have an Mn from 500 to 200,000 Daltons (Da=g/mole), suitably from 1,000 to 100,000 Da, such as from 2,000 to 75,000 Da, or even from 2,500 to 50,000 Da.

The polyester imide polymer may have an Mn of at least 500 Da, suitably at least 1,000 Da, such as at least 2,000 Da, or even from 2,500 Da. The polyester imide polymer may have an Mn of up to 200,000 Da, suitably up to 100,000 Da, such as up to 75,000 Da, or even up to 50,000 Da. The polyester imide polymer may have an Mn from 500 to 200,000 Da, suitably from 1,000 to 200,000 Da, such as from 2,000 to 200,000 Da, or even from 2,500 to 200,000 Da. The polyester imide polymer may have an Mn from 500 to 100,000 Da, suitably from 1,000 to 100,000 Da, such as from 2,000 to 100,000 Da, or even from 2,500 to 100,000 Da. The polyester imide polymer may have an Mn from 500 to 75,000 Da, suitably from 1,000 to 75,000 Da, such as from 2,000 to 75,000 Da, or even from 2,500 to 75,000 Da. The polyester imide polymer may have an Mn from 500 to 50,000 Da, suitably from 1,000 to 50,000 Da, such as from 2,000 to 50,000 Da, or even from 2,500 to 50,000 Da.

The number-average molecular weight may be measured by any suitable method. Techniques to measure the number-average molecular weight will be well known to a person skilled in the art. Suitably, the Mn may be determined by gel permeation chromatography using a polystyrene standard according to ASTM D6579-11("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The polyester imide polymer may have any suitable weight-average molecular weight (Mw). The polyester imide polymer may have an Mw from 500 to 200,000 Daltons (Da=g/mole), suitably from 1,000 to 100,000 Da, such as from 2,000 to 75,000 Da, or from 2,500 to 50,000 Da, or from 4,000 to 40,000.

The polyester imide polymer may have an Mw of at least 500 Da, suitably at least 1,000 Da, such as at least 2,000 Da, or at least 2,500 Da or at least 4,000 Da. The polyester imide polymer may have an Mw of up to 200,000 Da, suitably up to 100,000 Da, such as up to 75,000 Da, or up to 50,000 Da or up to 40,000 Da. The polyester imide polymer may have an Mw from 500 to 200,000 Da, suitably from 1,000 to 200,000 Da, such as from 2,000 to 200,000 Da, or from 2,500 to 200,000 Da or from 4,000 to 200,000 Da. The polyester imide polymer may have an Mw from 500 to 100,000 Da, suitably from 1,000 to 100,000 Da, such as from 2,000 to 100,000 Da, or from 2,500 to 100,000 Da or from 4,000 to 100,000 Da. The polyester imide polymer may have an Mw from 500 to 75,000 Da, suitably from 1,000 to 75,000 Da, such as from 2,000 to 75,000 Da, or from 2,500 to 75,000 Da or from 4,000 to 75,000 Da. The polyester imide polymer may have an Mw from 500 to 50,000 Da, suitably from 1,000 to 50,000 Da, such as from 2,000 to 50,000 Da, or from 2,500 to 50,000 Da or from 4,000 to 50,000 Da.

A person skilled in the art will appreciate that techniques to measure the number-average molecular weight may also be applied to measure the weight-average molecular weight.

The polyester imide polymer according to any aspect of the present invention may be in solid form at room temperature and at atmospheric pressure.

The polyester imide polymer may have any suitable glass transition temperature (Tg). The polyester imide polymer may have a Tg from to 20 to 150° C., suitably from 25 to 100° C., such as from 30 to 80° C., or from 40 to 70° C.

The polyester imide polymer may have a Tg of at least 20° C., suitably at least 25° C., such as at least 30° C., or even at least 40° C. The polyester imide polymer may have a Tg of up to 150° C., suitably up to 100° C., such as up to 80° C., or even up to 70° C. The polyester imide polymer may have a Tg from 20 to 150° C., suitably from 25 to 150° C., such as from 30 to 150° C., or even from 40 to 150° C. The polyester imide polymer may have a Tg from 20 to 100° C., suitably from 25 to 100° C., such as from 30 to 100° C., or even from 40 to 100° C. The polyester imide polymer may have a Tg from 20 to 80° C., suitably from 25 to 80° C., such as from 30 to 80° C., or even from 40 to 80° C. The polyester imide polymer may have a Tg from 20 to 70° C., suitably from 25 to 70° C., such as from 30 to 70° C., or even from 40 to 70° C.

The Tg of the polyester imide polymer may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning Calorimetry". Heat-flux differential scanning calorimetry (DSC), sample pans: aluminium, reference: blank, calibration: indium and mercury, sample weight: 10 mg, heating rate: 20° C./min).

Suitably, the polyester imide polymer may have a Tg from 40 to 70° C.

The polyester imide polymer may have any suitable viscosity at 180° C. The polyester imide polymer may have a viscosity at 180° C. from 2 to 500 Poise, suitably from 10 to 500 Poise, such as from 50 to 500 Poise, or from 80 to 500 Poise, or from 80 to 450 Poise.

Melt viscosity is determined using a cone and plate viscometer with a heated plate with cones which can be selected together with appropriate rotational speeds to measure viscosities within the desired ranges. In this work the cone and plate viscometer used was a Brookfield CAP 2000+ machine which is capable of measuring viscosities at temperatures 100-250° C. The temperature selected for the measurement was held constant throughout the measurement time and the detail of the temperature used is recorded in each example. The cone used was a spindle number 6 and the speed of rotation was selected to ensure that the range of measurements fell well within the total measurement range.

The coating composition may be a powder composition or a liquid composition. When the composition is a liquid composition the composition may comprise a solvent and/or carrier. The powder may be present in a liquid carrier in the form of a dispersion or slurry, for example.

The coating composition may comprise a single solvent/carrier or a mixture of solvents/carriers. The solvent/carrier may comprise water, an organic solvent/carrier, a mixture of water and an organic solvent/carrier or a mixture of organic solvents/carriers.

The organic solvent/carrier suitably has sufficient volatility to essentially entirely evaporate from the coating composition during the curing process. As a non-limiting example, the curing process may be by heating at 130-300° C. for 1-15 minutes.

Suitable organic solvents/carriers include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO trade name; alcohols such as ethanol; n-propanol; isopropanol; methoxy propanol; and n-butanol; ketones such as acetone; cyclohexanone; methylisobutyl ketone; methyl ethyl ketone; esters such as ethyl acetate; butyl acetate; n-hexyl acetate; dibasic esters; butoxyl; glycols such as butyl glycol; glycol ethers such as 1-methoxypropanol; ethylene glycol monomethyl ether; ethylene glycol monobutyl ether; benzyl alcohol mixed with xylene; benzyl acetate; ethyl lactate; n-butyl pyrrolidone and combinations thereof. The solvent/carrier, when present, may suitably be used in the coating composition in amounts from about 10 to 90 wt %, such as from about 20 to 80 wt %, or even from about 30 to 70 wt % based on the total solid weight of the coating composition.

The coating composition may be a thermoset powder coating composition.

The coating composition of the present invention comprises a crosslinker. The crosslinker may be any suitable crosslinker operable to crosslink the acid functionality on the polyester imide polymer.

Suitable crosslinkers will be well known to the person skilled in the art. Suitable crosslinkers include, but are not limited to the following: phenolic resins (or phenol-formaldehyde resins); aminoplast resins (or triazine-formaldehyde resins); amino resins; epoxy resins; epoxy-mimic resins, such as those based on bisphenols and other bisphenol A (BPA) replacements; isocyanate resins, isocyanurate resins, such as triglycidylisocyanurate; hydroxy (alkyl) amide resins, such as β-hydroxy (alkyl) amide resins; hydroxy(alkyl) urea resins; carbodiimide resins; oxazolines; polyamines; polyamides and combinations thereof.

The crosslinker may be selected from hydroxy (alkyl) amide resins, such as β-hydroxy (alkyl) amide resins; hydroxy(alkyl) urea resins; carbodiimide resins, such as polycarbodiimide resins; oxazolines; isocyanurate resins, such as triglycidylisocyanurate; epoxy-mimic resins, such as those based on bisphenols and other bisphenol A (BPA) replacements; or combinations thereof. Suitably, the crosslinker may be selected from hydroxy (alkyl) amide resins, such as β-hydroxy (alkyl) amide resins and/or hydroxy (alkyl) urea resins and/or carbodiimide resins. Suitably, the crosslinker may be selected from hydroxy (alkyl) amide resins, such as β-hydroxy (alkyl) amide resins and/or hydroxy(alkyl) urea resins.

Suitably, the crosslinker comprises a hydroxyalkylamide material and/or a hydroxyalkylurea material and/or a carbodiimide resin. Suitably, the crosslinker comprises a hydroxyalkylamide material and/or a hydroxyalkylurea material.

The crosslinker may comprise a phenolic resin. Non-limiting examples of phenolic resins are those formed from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins include, but are not limited to PHENODUR® PR285, VPR1785, PR517 and BR612 and resins sold under the trademark BAKELITE® such as BAKELITE 6582 LB.

The crosslinker may comprise an isocyanate resin. Suitable isocyanates include but are not restricted to multifunctional isocyanates. Suitable examples of multifunctional polyisocyanates include, but are not limited to the following: aliphatic diisocyanates like hexamethylene diisocyanate and isophorone diisocyanate; and aromatic diisocyanates like toluene diisocyanate and 4,4'-diphenylmethane diisocyanate. The polyisocyanates may be blocked or unblocked. Examples of other suitable polyisocyanates include, but are non limited to the following: isocyanurate trimers; allophanates; uretdiones of diisocyanates; polycarbodiimides and combinations thereof. Suitable examples of commercially available polyisocyanates include but are not restricted to DESMODUR VP LS 2078/2 and DESMODUR N3390, which are sold by Bayer Corporation, and TOLONATE HDT90, which is sold by Rhodia Inc.

Suitable amino resins include melamine formaldehyde type materials of the hexakis(methoxymethyl)melamine (HMMM) type such as KOMELOL 90GE (commercially available from Melamin), MAPRENAL MF900 (commercially available from Ineos Melamines) or RESIMENE 745 or RESIMENE 747 (commercially available from Ineos Melamines) or CYMEL 303 or CYMEL MM100 (commercially available from Cytec). Other melamine formaldehyde type material such as butylated methylol melamine type resins such as CYMEL 1156 or CYMEL 1158 (commercially available from Cytec) or mixed ether type methylal melamine resins such as CYMEL 1116, CYMEL 1130, CYMEL 1133 or CYMEL 1168 (commercially available from Cytec), particularly suitable amino resins would include part methylolated or part methalated melamine type resins such as CYMEL 370, CYMEL 325 or CYMEL 327 (commercially available from Cytec).

Other types of suitable amino resins include benzoguanamine, formaldehyde type materials like CYMEL1123 (commercially available from Cytec), Itamin BG143 (commercially available from Galstaff Multiresine) or Uramex BF892 (commercially available from DSM). Further examples of suitable amino resins include glycouril based materials such as CYMEL 1170 and CYMEL 1172 (commercially available from Cytec).

Suitable hydroxyl-functional silicone resins include DOW CORNING 255 or DOW CORNING 217 (commercially available from Dow Corning).

The crosslinker may be an acid reactive crosslinker, that is a crosslinker that is operable to crosslink polymers by reaction with acid functional groups on the polymers, suitably between carboxyl functional groups on the polymers.

The crosslinker may be selected from hydroxy (alkyl) amide resins, such as β-hydroxy (alkyl) amide resins; hydroxy(alkyl) urea resins; carbodiimide resins; oxazolines; gyloxal; isocyanurate resins, such as triglycidylisocyanurate; epoxy-mimic resins, such as those based on bisphenols and other bisphenol A (BPA) replacements; or combinations thereof. Suitably, the crosslinker may be selected from hydroxy (alkyl) amide resins, such as β-hydroxy (alkyl) amide resins; hydroxy(alkyl) urea resins; or combinations thereof.

The crosslinker may contain nitrogen. The crosslinker may be in the form of an amine or amide material. The crosslinker may be a hydroxyl functional crosslinker. The crosslinker may comprise a hydroxyl substituted amine or amide material.

The crosslinker may comprise a hydroxyalkylamide crosslinker. Suitably, the crosslinker comprises a β-hydroxyalkylamide crosslinker. Suitably, when the coating composition is a thermoset powder coating composition, the crosslinker comprises a solid crosslinker, such as a β-hydroxyalkylamide crosslinker.

The hydroxyalkylamide crosslinker may contain a terminal chemical group as shown in Formula I.

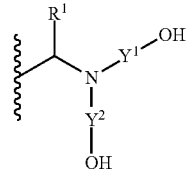

Formula I wherein $R^1$ represents an electron withdrawing group, such as (=O);
and $Y^1$ and $Y^2$ each, independently, represents a $C_1$ to $C_3$ alkylene group.

The terminal chemical group of Formula I may be connected to a further chemical structure, not shown. Additionally or alternatively, the chemical group of formula I may be suspended from a carrier substrate, such as a silica carrier substrate, for example.

The hydroxyalkylamide crosslinker may contain a plurality of terminal chemical groups as shown in Formula I. For example, the hydroxyalkylamide crosslinker may contain 2, 3 or 4 terminal chemical groups as shown in Formula I.

The hydroxyalkylamide crosslinker may comprise a moiety according to Formula II:

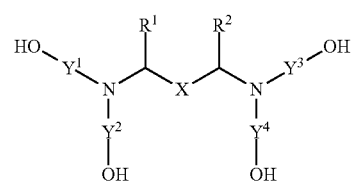

Formula II wherein $R^1$ and $R^2$ with reference to Formula II each, independently, represent an electron withdrawing group, such as (=O); $Y^1$, $Y^2$, $Y^3$ and $Y^4$ with reference to Formula II each, independently, represent a $C_1$ to $C_3$ alkylene group; and X is a $C_2$ to $C_6$ alkylene group.

Suitably, each of $R^1$ and $R^2$ with reference to Formula II represents a (=O) group.

Suitably, each of Y1, Y2, Y3 and Y4 with reference to Formula II represent an ethylene group.

Suitably, X represents a butylene group.

Accordingly, the hydroxyalkylamide crosslinker comprises a material of formula III:

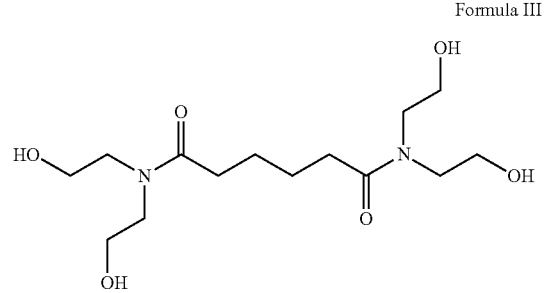 [SMILES: O=C(CCCCC(=O)N(CCO)CCO)N(CCO)CCO]

Formula III

The coating composition of the present invention may comprise a commercially available hydroxyalkylamide crosslinker such as, for example, PRIMID XL-552 (available from EMS Chemie); PRIMID QM-1260 (available from EMS Chemie); PRIMID SF-4510 (available from EMS Chemie) and N,N,N',N'-tetrakis(2-hydroxypropyl)adipamide.

The crosslinker may be in the form of a urea material. The crosslinker may comprise a hydroxyl substituted urea material.

Suitably, the crosslinker may comprise a hydroxy functional alkyl polyurea material.

The crosslinker may contain a terminal chemical group as shown in Formula IV.

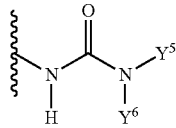

Formula IV wherein $Y^5$ and $Y^6$ each, independently, represent hydrogen, an alkyl or a hydroxy functional alkyl having two or more carbon atoms and at least one of $Y^5$ and $Y^6$ is a hydroxyl functional alkyl having two or more carbon atoms.

The $Y^5$ and $Y^6$ groups may exclude ether linkages.

The terminal chemical group of Formula IV may be connected to a further chemical structure, not shown. Additionally or alternatively, the chemical group of Formula IV may be suspended from a carrier substrate, such as a silica carrier substrate, for example.

The crosslinker may contain a plurality of terminal chemical groups as shown in Formula IV. For example, the crosslinker may contain 2 to 6 terminal chemical groups as shown in Formula IV, such as 2, 3 or 4 terminal chemical groups as shown in Formula IV.

The crosslinker material may comprise a moiety according to Formula V:

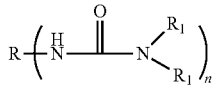

Formula V wherein R with reference to Formula V comprises the residue of an isocyanurate, biuret, allophonate, glycoluril, benzoguanamine, polyetheramine, and/or polymeric moiety having an Mn of 500 or greater; each $R_1$ with reference to Formula V is independently a hydrogen, an alkyl or a hydroxy functional alkyl having 2 or more carbons and at least one $R_1$ with reference to Formula V is a hydroxy functional alkyl having 2 or more carbons; and n is 2-6.

Suitably, the $R_1$ group with reference to Formula V may exclude ether linkages.

The crosslinker may comprise a moiety according to Formula VI:

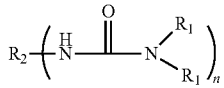

Formula VI wherein $R_2$ with reference to Formula VI comprises a substituted or unsubstituted $C_1$ to $C_{36}$ alkyl group, an aromatic group, or the residue of an isocyanurate, biuret, allophonate, glycoluril, benzoguanamine, polyetheramine, and/or a polymeric moiety having an Mn of 500 or greater; each $R_1$ with reference to Formula VI is independently a hydrogen, an alkyl group having 1 or more carbons, or a hydroxy functional alkyl having 2 or more carbons and at least one $R_1$ with reference to Formula VI is a hydroxy functional alkyl having 2 or more carbons; and n is 2-6.

Suitably, when $R_2$ with reference to Formula VI is a substituted or unsubstituted $C_1$ to $C_{36}$ alkyl group the acid functional polyester material comprises COOH functionality that reacts with the polyurea to form an ester linkage.

Suitably, the $R_1$ group with reference to Formula VI may exclude ether linkages.

It will be understood that when $R_2$ with reference to Formula VI is a substituted or unsubstituted alkyl group, there may be two $R_2$ groups with reference to Formula VI attached to the N, and the two $R_2$ groups with reference to Formula VI may be the same or different. For example, if the hydroxy functional alkyl polyurea is formed from the reaction of dimethyl carbonate with dibutylamine and diisopropanol amine, there will be two $R_2$ groups with reference to Formula VI that will each be C4.

R and $R_2$ with reference to Formula VI may comprise the residue of an isocyanurate, biuret, allophonate, glycoluril, benzoguanamine, polyetheramine and/or polymeric moiety having an Mn of 500 or greater. An isocyanurate will be understood as referring to a compound having three isocyanate groups, typically in ring form, and is sometimes referred to as a trimer. This can include compounds having one or more isocyanurate moieties. Isocyanurates can be purchased from Covestro and Vencore X Chemical. Suitable commercially available isocyanurates include those sold under the trade name DESMODUR such as, for example, DESMODUR N 3300A, DESMODUR N3800, DESMODUR N3790, DESMODUR N3400, DESMODUR N3600, DESMODUR N3900 and DESMODUR RC (commercially available from Covestro), those sold under the trade name VESTANANT such as, for example, VESTANAT T1890/100 (commercially available from Evonik) and those sold under the trade name EASAQUA such as, for example, EASAQUA WT 2102, EASAQUA X D 401, EASAQUA M 501, EASAQUA X D 803, EASAQUA M 502 and EASAQUA X L 600 (commercially available from Vencore X Chemical). Unsaturated isocyanate monomers include but are not limited to 2-acryloyloxyethylisocyanate (AOI), 2-methacryloyloxyethyl isocyanate (MOI), alpha, alpha-dimethyl meta-isopropenyl benzyl isocyanate (TMI), and the adduct of 2-hydroxyethyl acrylate (HEA) and IPDI in 1:1 ratio. A particularly suitable hydroxy functional alkyl polyurea formed from an isocyanurate is shown in Formula VII:

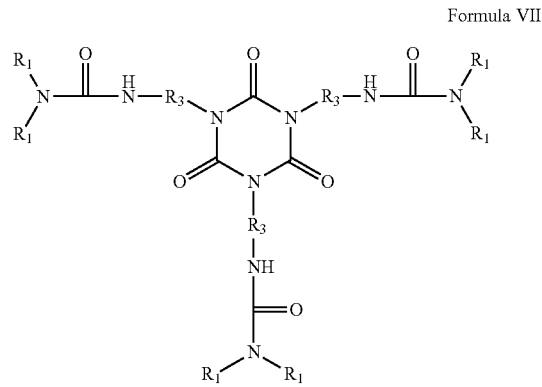

Formula VII wherein $R_1$ with reference to Formula VII is as described above; and each $R_3$ independently comprises an alkyl, aryl, alkylaryl, arylalkyl, alicyclic, and/or polyetheralkyl group.

A particularly suitable hydroxy functional alkyl polyurea formed from a bis-isocyanurate is shown below in Formula VIII:

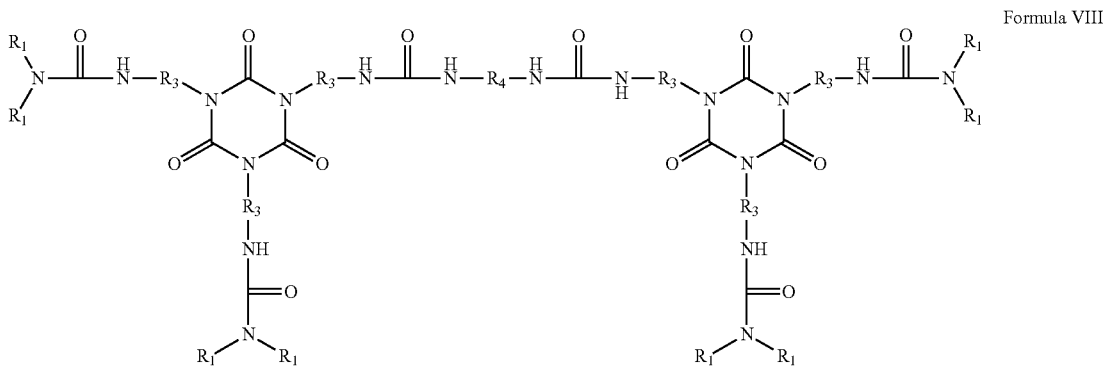

Formula VIII wherein $R_1$ and $R_3$ with reference to Formula VIII are as described above.

A biuret will be understood as referring to a compound that results upon the condensation of two molecules of urea, and is sometimes referred to as a carbamylurea. Biurets are commercial available from Vencore X Chemical and Covestro as, for example, DESMODUR N-75, DESMODUR N-100, and DESMODUR N-3200, HDB 75B, HDB 75M, HDB 75MX, HDB-LV. A particularly suitable hydroxy functional alkyl polyurea formed from a biuret is shown below in Formula IX:

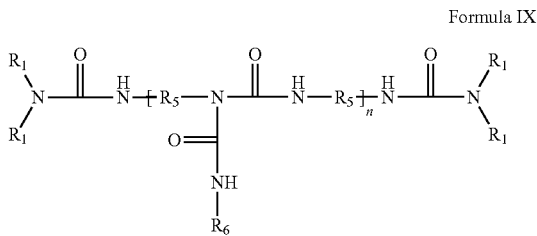

Formula IX wherein $R_1$ with reference to Formula IX is as described above; each $R_5$ independently comprises an alkyl, aryl, alkylaryl, arylalkyl, alicyclic, and/or polyetheralkyl group; and $R_6$ comprises H or an alkyl group.

Uretidione is a dimer of diisocyanate, examples of which include DESMODUR N-3400 polyisocyanate, a blend of the trimer and uretidione of HDI:

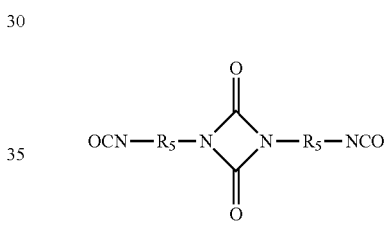

wherein each $R_5$ independently comprises an alkyl, aryl, alkylaryl, arylalkyl, alicyclic, and/or polyetheralkyl group.

An allophonate will be understood as referring to a compound made from urethane and isocyanate. A method for making an allophonate is described at Surface Coating, Vol 1, Raw material and their usage, Landon New York, Chapman and Hall, Page 106. The reaction is generally depicted below in scheme I:

Scheme I

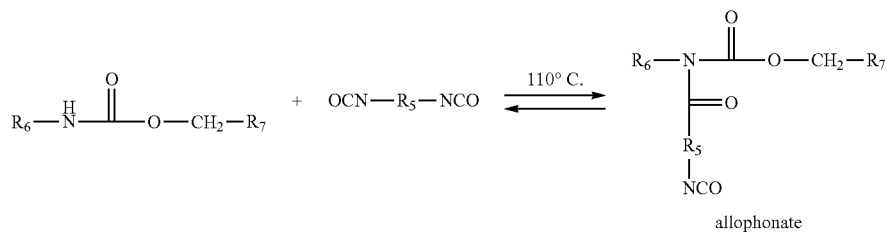

allophonate wherein $R_5$ and $R_6$ with reference to Scheme I are each as described above; and $R_7$ independently comprises the residue of a primary alcohol.

A glycoluril will be understood as referring to a compound composed of two cyclic urea groups joined across the same two-carbon chain, a suitable examples of which includes the below:

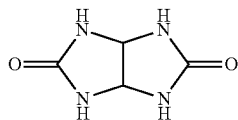

Glycoluril is widely commercially available, such as from Sigma-Aldrich. Benzoguanamine is also known as 6-phenyl-1,3,5-triazine-2,4-diamine and is commercially available from The Chemical Company, Jamestown, RI.

A polyether amine will be understood as referring to a compound having one or more amine groups attached to a polyether backbone such as one characterized by propylene oxide, ethylene oxide, or mixed propylene oxide and ethylene oxide repeating units in their respective structures, such as, for example, one of the Jeffamine series products. Examples of such polyetheramines include aminated propoxylated pentaerythritols, such as JEFFAMINE XTJ-616, and those represented by Formulas (X) through (VI).

According to Formula (IV) the polyether amine may comprise:

Formula X

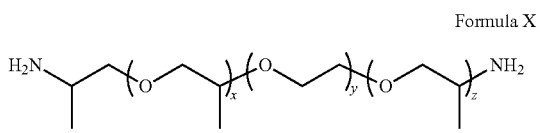

wherein y=0-39, x+z=1-68.

Suitable amine-containing compounds represented by Formula X include, but are not limited to, amine-terminated polyethylene glycol such as those commercially available from Huntsman Corporation in its JEFFAMINE ED series, such as JEFFAMINE HK-511, JEFFAMINE ED-600, JEFFAMINE ED-900 and JEFFAMINE ED-2003, and amine-terminated polypropylene glycol such as in its JEFFAMINE D series, such as JEFFAMINE D-230, JEFFAMINE D-400, JEFFAMINE D-2000 and JEFFAMINE D-4000.

According to Formula XI the polyetheramine may comprise:

Formula XI

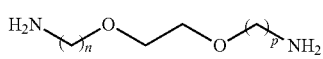

wherein each p independently is 2 or 3.

Suitable amine-containing compounds represented by Formula XI include, but are not limited to, amine-terminated polyethylene glycol based diamines, such as Huntsman Corporation's JEFFAMINE EDR series, such as JEFFAMINE EDR-148 and JEFFAMINE EDR-176.

According to Formula XII the polyetheramine may comprise:

Formula XII

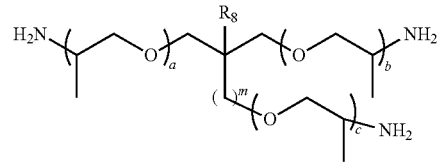

wherein $R_8$ is H or $C_2H_5$, m=0 or 1, a+b+c=5-85.

Suitable amine-containing compounds represented by Formula (VI) include, but are not limited to, amine-terminated propoxylated trimethylolpropane or glycerol, such as Huntsman Corporation's Jeffamine T series, such as JEFFAMINE T-403, JEFFAMINE T-3000 and JEFFAMINE T-5000.

Particularly suitable are di- and tri- amines, such as 4,7,10-trioxa-1,13-tridecanediamine, JEFFAMINE D400, JEFFAMINE D4000, JEFFAMINE D2000, JEFFAMINE T403.

A "polymeric moiety" as used herein in the context of R or $R_2$ with reference to Formulas V to IX refers to any polymer or oligomer to which has been attached two to six hydroxy functional alkyl polyurea groups. The polymer can be, for example, a polyester polyurethane, a polyether polyurethane, or a polyamide polyurethane. The moiety can itself contain functionality, such as acid functionality, hydroxy functionality, and/or amine functionality. The polymeric moiety (which may be oligomeric as noted above) has an Mn of 500 or greater, such as 1000 or greater, 2500 or greater, 4000 or greater, or 5,000 or greater. Mn, as used herein, refers to the number average molecular weight and means the theoretical value as determined by Gel Permeation Chromatography using Waters 2695 separation module with a Waters 410 differential refractometer (RI detector) and polystyrene standards. The Mn values reported according to the invention were determined using this method. Tetrahydrofuran (THF) was used as the eluent at a flow rate of 1 ml min$^{-1}$, and two PL Gel Mixed C columns were used for separation.

In all cases, R and $R_2$ with reference to Formulas V to IX may be substituted or unsubstituted. $R_2$ with reference to Formulas V to IX, as noted above, may also comprise a substituted or unsubstituted $C_1$ to $C_{36}$ alkyl group and/or an aromatic group. For example, the alkyl group may have two to ten carbon atoms, such as six carbon atoms. The alkyl group may derive from an isocyanate, such as a diisocyanate. Suitable examples include isophorone diisocyanate and hexamethylene isocyanate. The aromatic group may derive from an aromatic ring containing isocyanate, suitable examples of which include methylene diphenyl diisocyanate, toluene diisocyanate and tetramethylxylylene diisocyanate.

Certain hydroxy functional alkyl polyureas of, and/or used according to, the invention may be made by reacting an isocyanate-containing compound with amino alcohol. Any isocyanate-containing compound having at least two isocyanate groups can be used, such as any of those described above. It will be appreciated that the "R" or "$R_2$" group with reference to Formulas V to IX will reflect the isocyanate-containing compound selected, if one is used.

Similarly, any amino alcohol having two or more carbon atoms can be used, and the "$R_1$" group with reference to Formulas V to IX will reflect the amino alcohol selected. The amino alcohol can have one, two or more hydroxyl functional groups. One or more amino alcohols can be used, which will result in different $R_1$ groups with reference to Formulas V to IX being present on the polyurea. $R_1$ with reference to Formulas V to IX can also be hydrogen or an alkyl group. Suitable amino alcohols include monoethanol amine, diethanol amine and diisopropanol amine.

The hydroxyl functional alkyl polyureas can be made by reacting amino alcohol with an isocyanate-containing compound in an organic polar solvent, such as alcohol or water. The equivalent ratio of amine to isocyanate may be 2-1:1-2, such as 1:1.

The hydroxy functional alkyl polyureas may be made by alternative methods as well. For example, amino alcohols can react with carbonate to form hydroxylalkyl carbamate, and hydroxylalkyl carbamate can further react with amines to form hydroxy functional alkyl polyureas.

The number-average molecular weight (Mn) of the hydroxy functional alkyl polyurea (even when the polyurea is in the form of a monomer or prepolymer, but not when R or R2 with reference to Formulas V to IX is a polymeric moiety) may be 100 or greater, such as 350 or greater or 1,000 or greater, and/or can be 6,000 or lower, such as 3,000 or lower, or 2,000 or lower. The Mn of the hydroxy functional alkyl polyurea when R or $R_2$ with reference to Formulas V to IX is a polymeric moiety can be 500 or greater, such as 1,000 or greater, 5,000 or greater or 10,000 or greater.

It has surprisingly and advantageously been found by the present inventors that the hydroxyl alkyl urea functional materials typically cure at a lower temperature than, for example, hydroxyalkylamide material, such as a β-hydroxyalkylamide material.

The crosslinker may be in the form of a carbodiimide resin. The crosslinker may comprise a polycarbodiimide. Suitably, the crosslinker may comprise a polycarbodiimide having the following structural units (XIII) or (XIV) including mixtures thereof:

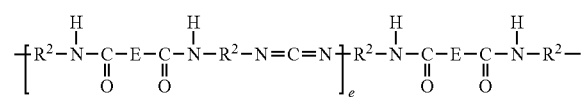

(XIII)

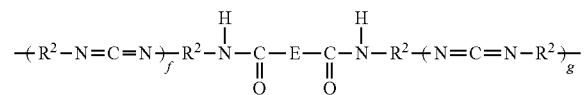

(XIV)

where e is an integer of from 2 to 20; f and g are each at least 1, and f+g is an integer up to 20; E is a radical selected from

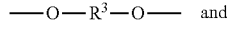 and (XV)

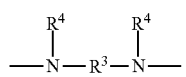

(XVI)

where $R^2$ with reference to structural units (XIII) or (XIV) comprises a cyclic radical and $R^3$ with reference to (XV) and (XVI) is a linear hydrocarbon radical containing at least 4 carbon atoms and $R^4$ with reference to (XVI) is hydrogen or an alkyl radical.

The polycarbodiimides may be prepared by reacting an organic group containing a polyisocyanate in the presence of a suitable catalyst to form a polycarbodiimide having terminal NCO-functionality, wherein an active hydrogen-containing compound is added before, during or after polycarbodiimide formation.

The polyisocyanate can be an aliphatic, including cycloaliphatic, or an aromatic polyisocyanate or mixture of the two. Aliphatic including cycloaliphatic polyisocyanates and alkaryl polyisocyanates are particularly suitable. The polyisocyanates can contain from 2 to 4, such as 2 isocyanate groups per molecule. Examples of suitable higher polyisocyanates are 1,2,4-benzene triisocyanate and polymethylene polyphenyl isocyanate. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate and alkaryl polyisocyanates such as m-tetramethylxylene diisocyanate. Also, cycloaliphatic diisocyanates can be employed. Examples include 1,4-cyclohexyl diisocyanate, isophorone diisocyanate, alpha, alpha-xylylene diisocyanate and 4,4-methylene-bis(cyclohexyl isocyanate). Substituted organic group-containing polyisocyanates can also be used in which the substituents are nitro, chloro, alkoxy and other groups that are not reactive with hydroxyl groups or active hydrogens and provided the substituents are not positioned to render the isocyanate group unreactive.

The active hydrogen-containing compound used in the preparation of the polycarbodiimide is suitably a chain extender or spacer linking polyisocyanates together to form NCO-adducts or to link NCO-functional polycarbodiimides together. Any suitable organic compound containing active hydrogens may be used. The term "active hydrogen atoms" refers to hydrogens which, because of their position in the molecule, display activity according to the Zerewitinoff test. Accordingly, active hydrogens include hydrogen atoms attached to oxygen or nitrogen, and thus useful compounds will include those having at least two of these groups (in any combination):

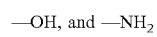

The moieties attached to each group can be aliphatic, including cycloaliphatic, aromatic, or of a mixed type with aliphatic being particularly suitable.

The active hydrogen-containing material can contain from 2 to 4, particularly suitable 2 active hydrogens per molecule.

Examples of such compounds include amines, which includes polyamines, aminoalcohols, mercapto-terminated derivatives, and alcohols that includes polyhydroxy materials (polyols) that are particularly suitable because of the ease of reaction with polyisocyanates. Also polyols generally give no side reactions, giving higher yields of urethane product with no by-product and the products are hydrolytically stable. Also, with regard to polyols, there are a wide variety of materials available which can be selected to give a wide spectrum of desired properties. In addition, the polyols have desirable reaction rates with polyisocyanates. Both saturated and unsaturated active hydrogen-containing compounds can be used, but saturated materials are particularly suitable because of superior coating properties.

The polyhydroxyl materials or polyols can be either low or high molecular weight materials and in general will have average hydroxyl values as determined by ASTM designation E-222-67, Method B, of 2000 and below, such as between 2000 and 10. The term "polyol" is meant to include materials having an average of two or more hydroxyl groups per molecule.

The polyols include low molecular weight diols, triols and higher molecular weight polyols, low molecular weight amide-containing polyols and higher polymeric polyols such as polyester polyols, polyether polyols, polycarbonate polyols and hydroxy-containing (meth)acrylic polymers. The polymers typically have hydroxyl values of from 10 to 180. Also, the polymers typically have number average molecular weights of 96 to 10,000 Da.

The low molecular weight diols, triols and higher alcohols useful in the instant invention are known in the art. They have hydroxy values of 200 or above, usually within the range of 200 to 2000. Such materials include aliphatic polyols, particularly alkylene polyols containing from 4 to 18 carbon atoms. Examples include 1,4-butanediol and 1,6-hexanediol. Also useful are polyols containing ether linkages such as diethylene glycol and tetraethylene glycol.

To form the polycarbodiimide, the polyisocyanate with or without the active hydrogen-containing compound may be condensed with the elimination of carbon dioxide to form the polycarbodiimide, that is, a polymer containing [N=C=N]$_n$ units where n with reference to the [N=C=N]=2 to 20, such as 2 to 10.

The condensation reaction is typically conducted by taking the solution of the polyisocyanate and heating in the presence of suitable catalyst. Examples of catalyst include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the polyisocyanate being used. A concentration range of 0.05-5 parts of catalyst per 100 parts of adduct is generally suitable.

The resulting polycarbodiimide has terminal NCO groups that can then be reacted with an active hydrogen-containing hydrophilic compound.

The hydrophilic compound may be a polyether alcohol or polyether amine or mixtures thereof having a polyether backbone, typically based on ethylene oxide or mixed ethylene oxide and propylene and having a molecular weight greater than 500, such as at least 1000 on a number average basis. Typical alcohols and amines have the following structural formula:

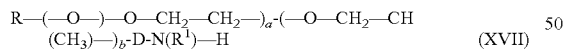

(XVII)

or

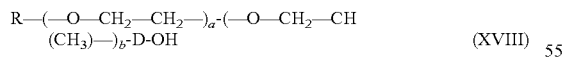

(XVIII)

where R with reference to formulas (XVII) and (XVIII) is $C_1$ to $C_4$ alkyl; a with reference to formulas (XVII) and (XVIII) is 5 to 50 and b with reference to formulas (XVII) and (XVIII) is 0 to 35, and when b with reference to formulas (XVII) and (XVIII) is present the mole ratio of a to b with reference to formulas (XVII) and (XVIII) is at least 1:1; $R^1$ with reference to formula (XVIII) is hydrogen ora hydrocarbon radical and D with reference to formulas (XVII) and (XVIII) is a divalent linking group or a chemical bond.

Reaction of the polyether alcohol or amine with the NCO-containing carbodiimide may be conducted with a stoichiometric equivalent of amine to NCO equivalents or a slight excess of alcohol or amine and at a temperature typically from 80 to 110° C. until an IR spectrum of the reaction mixture indicates substantially no remaining NCO functionality.

Depending on when the active hydrogen chain extender or spacer is used in the reaction, the polycarbodiimide has a structure such that each carbodiimide unit or polycarbodiimide unit is attached to a unit selected from urethane, thiourethane urea, thiourea and a hydrophilic unit occurs at one or terminal positions of the polycarbodiimide via a urethane or urea linkage.

Typically, the polycarbodiimide has a weight average molecular weight of 2600 to 12,000, such as 3000 to 10,000, and a diimide equivalent weight (number average molecular weight/number of carbodiimide groups) of at least 600, such as 600 to 2000.

When the active hydrogen chain extender is added before or during polycarbodiimide formation, that is, is used to chain extend a polyisocyanate to form an NCO-adduct, the polycarbodiimide can be represented from the following structural formula when the polyisocyanate and the active hydrogen-containing compound are difunctional:

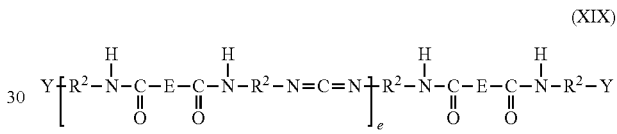

(XIX)

where e with reference to formula (XIX) is an integer of from 2 to 20, such as 2 to 10; E with reference to formula (XIX) is a radical selected from

(XX)

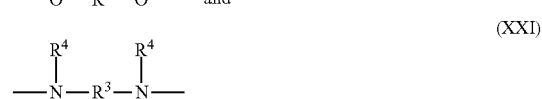

(XXI)

where $R^2$ with reference to formula (XIX) is a cyclic radical such as a cycloaliphatic or an alkaryl radical that may contain 6 to 20 carbon atoms such as those of the structure:

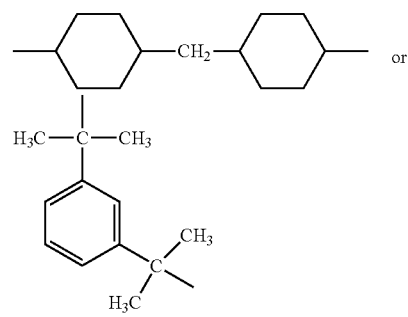

$R^3$ with reference to formula (XX) and (XXI) is a linear hydrocarbon radical optionally including hetero atoms containing at least 4 carbon atoms such as a polyethylene group having a number average molecular weight of 96 to 10,000. $R^4$ with reference to formula (XXI) is hydrogen or a hydrocarbon radical such as alkyl containing from 1 to 4 carbon atoms. Y with reference to formula (XIX) is a radical of the structure:

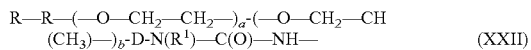  (XXII)

or

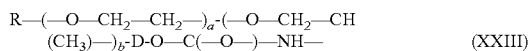  (XXIII)

where R with reference to formula (XXII) and (XXIII) is $C_1$ to $C_4$ alkyl; a with reference to formula (XXII) and (XXIII) is 5 to 50 and b with reference to formula (XXII) and (XXIII) is 0 to 35, and when b with reference to formulas (XXII) and (XXIII) is present the mole ratio of a to b with reference to formulas (XXII) and (XXIII) is at least 1:1; $R^1$ with reference to formula (XXII) is hydrogen or a hydrocarbon radical and D with reference to formula (XXII) and (XXIII) is a divalent linking group or a chemical bond.

When the active hydrogen chain extender is added after polycarbodiimide formation, that is, is used to chain extend an NCO-functional polycarbodiimide, the polycarbodiimide can be represented from the following structural formula when the NCO-functional polycarbodiimide and the active hydrogen-containing compound are difunctional.

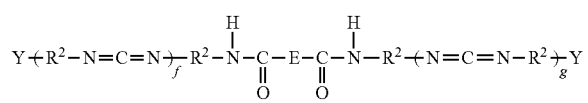  (XXIV)

where f and g with reference to formula (XXIV) are each at least 1, and f+g with reference to formula (XXIV) is an integer up to 20 such as up to 10; E with reference to formula (XXIV) is a radical selected from

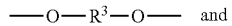  (XXV)

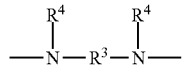  (XXVI)

where $R^2$, $R^3$, $R^4$ and Y with reference to formulas (XXIV), (XXV) and (XXVI) have the meanings mentioned above for (XIX).

Organic solvent can optionally be present in the synthesis of the polycarbodiimide. Polar water miscible solvents such as N-methyl pyrrolidone can be used in amounts of about 5-25 percent by weight based on weight of the reaction mixture.

The coating composition may comprise any suitable weight ratio of polyester imide (a) to crosslinker (b). The coating composition may have a weight ratio of (a) to (b) from to 50:1 to 1:10, suitably from 50:1 to 1:1, such as from 30:1 to 10:1, or even from 25:1 to 15:1.

The powder coating composition of the present invention may have any suitable average particle size. The coating composition may have an average particle size from 10 to 1,000 microns (pm), suitably from 10 to 500 μm, such as from 10 to 250 μm, or even from 10 to 100 μm. Particles having these sizes may be produced by any suitable method. Suitable methods will be well known to a person skilled in the art. Examples of suitable methods include, but are not limited to, cold grinding and sieving methods.

The average particle size is a D50 value, being the median value that splits the distribution with half above and half below this size. This value is based on volume and sometimes referred to as Dv50.

The coating compositions of the present invention may comprise any suitable amount of polyester imide polymer (a). The coating composition may comprise from 10 to 99.9 wt %, suitably from 25 to 99 wt %, such as from 50 to 99 wt % of even from 60 to 99 wt % of the polyester imide polymer (a) based on the total solid weight of the coating composition.

The coating compositions of the present invention may comprise any suitable amount of crosslinker (b). The coating compositions may comprise from 1 to 20 wt %, suitably from 1.5 to 15 wt %, such as from 2 to 10 wt %, or even from 2.5 to 7.5 wt % of crosslinker (b) based on the total solid weight of the coating composition.

The coating composition may comprise at least 1 wt %, suitably at least 1.5 wt %, such as at least 2 wt %, or even at least 2.5 wt % of crosslinker (b) based on the total solid weight of the coating composition. The coating composition may comprise up to 20 wt %, suitably up to 15 wt %, such as up to 10 wt %, or even up to 7.5 wt % of crosslinker (b) based on the total solid weight of the coating composition. The coating composition may comprise from 1 to 20 wt %, suitably from 1.5 to 20 wt %, such as from 2 to 20 wt %, or even from 2.5 to 20 wt % of crosslinker (b) based on the total solid weight of the coating composition. The coating composition may comprise from 1 to 15 wt %, suitably from 1.5 to 15 wt %, such as from 2 to 15 wt %, or even from 2.5 to 15 wt % of the crosslinker (b) based on the total solid weight of the coating composition. The coating composition may comprise from 1 to 10 wt %, suitably from 1.5 to 10 wt %, such as from 2 to 10 wt %, or even from 2.5 to 10 wt % of crosslinker (b) based on the total solid weight of the coating composition. The coating composition may comprise from 1 to 7.5 wt %, suitably from 1.5 to 7.5 wt %, such as from 2 to 7.5 wt %, or even from 2.5 to 7.5 wt % of the crosslinker (b) based on the total solid weight of the coating composition.

The composition of the present invention may comprise titanate material. The titanate material may comprise organic titanate material, such as titanate substituted with (such as one, two, three or four) organic groups. Each organic group in this context may include a substituted or unsubstituted, linear, cyclic or branched $C_1$ to $C_{12}$ alkyl, alkenyl, or aryl group.

The titanate material may comprise titanate substituted with (such as one, two, three or four) organic groups, each independently selected from methyl, ethyl, n-propyl, isopropyl, n-butyl, t-butyl, pentyl, hexyl, cyclohexyl.

The titanate material may be selected from the group consisting of tetra n-butyl titanate; tetra iso-propyl titanate; tetra ethyl hexyl titanate; zinc acetate; di butyl tin oxide; butyl stannoic acid; or combinations thereof.

The titanate material may be present in the coating composition in an amount of at least 0.1 wt % (based on the dry weight of the coatings ingredients), or at least 0.5 wt %, or at least 1 wt %.

The titanate material may be present in the coating composition in an amount of at less than 25 wt % (based on the dry weight of the coatings ingredients), more suitably less than 15 wt % or less than 10 wt % or less than 5 wt %.

The titanate material may be present in the coating composition in an amount of between 0.1-10 wt % (based on the dry weight of the coatings ingredients) and more suitably between 0.5-6 wt % or between 1-5 wt %.

Where the coating composition of the present invention is a solid material, such as a powder coating composition, for example, the titanate material may be added to the polyester imide material having an acid value ≥10 in a solvent, then the resulting component dried, thereby capturing the titanate material in the solid coating composition.

The coating compositions of the present invention may further comprise pigment and/or filler. The coating composition may comprise a single pigment or filler or a mixture of pigments and/or fillers. Suitable pigments include, but are not limited to, the following: titanium dioxide; ultramarine blue; phthalocyanines, such as phthalocyanine blue and phthalocyanine green; anthraquinones; quinacridones; thioindigos; carbon black; graphite fibrils; iron oxides, such as black iron oxide; chromium green oxide; ferried yellow; quindo red; or combinations thereof. Suitable fillers include, but are not limited to, the following: barium sulphate; silicas, such as precipitated silicas, fumed silica and clay; or combinations thereof.

Suitably, the coating composition may comprise titanium dioxide, barium sulphate or a combination thereof. Suitably, the coating composition may comprise titanium dioxide and barium sulphate.

The pigment and/or filler, when present, may be used in the coating compositions in any suitable amount. The pigment and/or filler, when present, may be used in the coating composition in amounts from 0 to 50 wt %, suitably from 0 to 40 wt %, such as from 0 to 30 wt %, or even from 0 to 25 wt % based on the total solid weight of the coating composition.

The coating compositions may further comprise a curing catalyst. The coating compositions may comprise any curing agent suitable to catalyse the reaction between the acid functional polyester material and the crosslinker, such as a hydroxyalkylamide crosslinker. Suitable curing catalysts will be well known to a person skilled in the art. Examples of suitable curing catalysts include, but are not limited to, the following: organic tin compounds, such as tin (II) salts of carboxylic acids, for example, tin (II) acetate, tin (II) octonoate, tin (II) ethylhexanoate and tin (II) laurate, tin (IV) compounds, for example, dibutyltin oxide, dibutyltin dichloride, dibutyltin diacetate, dibutyltin dilaurate, dibutyltin maleate and dioctyltin diacetate; tertiary amines, such as diazabicyclo[2.2.2]octane and 1,5-diazabicyclo[4.3.0]non-5-ene; and combinations thereof.

The coating compositions of the present invention may optionally comprise a further additive or combination of additives. The coating composition may optionally comprise any suitable additive or combination of additives. Suitable additives will be well known to the person skilled in the art. Examples of suitable additives include, but are not limited to the following: lubricants; diluents; plasticisers; surfactants; stabilising agents; flow control agents; thixotropic agents; and combinations thereof.

Suitable lubricants will be well known to the person skilled in the art. Suitable examples of lubricants include, but are not limited to the following: carnauba wax and polyethylene type lubricants. The lubricant, when present, may be used in the coating composition in amounts of at least 0.01 wt % based on the total solid weight of the coating composition.

Surfactants may optionally be added to the coating composition in order to aid in flow and wetting of the substrate. Suitable surfactants will be well known to the person skilled in the art. It will be appreciated by a person skilled in the art that when the coating composition is to be used in food and/or beverage container applications, the surfactant, when present, is chosen to be compatible with such applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be used in the coating composition in amounts from 0.01 to 10 wt % based on the total solid weight of the coating composition.

Suitable flow control agents will be well known to a person skilled in the art. Suitable flow control agents include, but are not limited to, the following: acrylate polymers, such as polylauryl acrylate, polybutyl acrylate, poly(2-ethylhexyl) acrylate, poly(ethyl-2-ethylhexyl) acrylate, polylauryl methacrylate and polyisodecenyl methacrylate; fluorinated polymers, such as an ester of polyethylene glycol or polypropylene glycol and fluorinated fatty acids, for example, an ester of polyethylene glycol of a molecular weight of over 2,500 Da and perfluorooctanoic acid; polymeric siloxanes, such as polymeric siloxanes of a molecular weight of over 1,000 Da, for example, poly(dimethylsiloxane) and poly(methylphenylsiloxane); and combinations thereof. The flow control agents, when present, may be used in the coating composition in amounts from 0.01 to 10 wt %, suitably from 0.1 to 5 wt %, such as from 0.5 to 4 wt %, or even from 1 to 3 wt % based on the total solid weight of the coating composition.

It will be appreciated by a person skilled in the art that the flow controls agents, when present, must be suitable for use in a powder composition.

The coating compositions according to the present invention are substantially free of bisphenol A (BPA) and derivatives thereof. The coating compositions may be essentially free or may be completely free of bisphenol A (BPA) and derivatives thereof. Derivatives of bisphenol A include, for example, bisphenol A diglycidyl ether (BADGE). The coating compositions according to the present invention are also substantially free of bisphenol F (BBF) and derivatives thereof. The coating compositions may be essentially free or may be completely free of bisphenol F (BPF) and derivatives thereof. Derivatives of bisphenol F include, for example, bisphenol F diglycidyl ether (BPFG). The compounds or derivatives thereof mentioned above may not be added to the composition intentionally but may be present in trace amounts because of unavoidable contamination from the environment. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions of the present invention may be essentially fee or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions of the present invention may be substantially free, may be essentially free or may be completely free of bromine. By "substantially free" we mean to refer to coating compositions containing less than 1000 parts per million (ppm) of bromine. By "essentially free" we mean to refer to coating compositions containing less than 100 ppm of bromine. By "completely free" we mean to refer to coating compositions containing less than 20 parts per billion (ppb) of bromine.

The coating compositions of the present invention may be substantially free, may be essentially free or may be completely free of solvent. By "substantially free" we mean to refer to coating compositions containing less than 1000 parts per million (ppm) of solvent. By "essentially free" we mean to refer to coating compositions containing less than 100 ppm of solvent. By "completely free" we mean to refer to coating compositions containing less than 20 parts per billion (ppb) of solvent.

The coating compositions of the present invention may be prepared by any suitable method. For example, the coating compositions may be prepared by first dry blending the acid functional polyester material, the crosslinker and, if present, pigment and/or filler, curing agent and additives in a blender. The blender may be operated for any suitable period of time. Suitably, the blender may be operated for a period of time sufficient to result in a homogeneous dry blend of the materials charged thereto. The homogenous dry blend may then be melt blended in an extruder, such as a twin-screw co-rotating extruder, operated within a temperature range from 80 to 140° C., suitably from 100 to 125° C. The extrudate of the coating composition may be cooled and is typically milled to an average particle size as described above.

The coating composition of the present invention is a curable coating composition. "Curable coating compositions" and like terms as used herein, refers to coating compositions that have an initial powder state and a final state in which the coating composition has been transformed into a substantially continuous, coalesced state.

The coating composition of the present invention may be cured by any suitable method. The coating composition may be cured by heat curing or by chemical curing, suitably by heat curing. The coating composition, when heat cured, may be cured at any suitable temperature. The coating composition, when heat cured, may be cured at temperatures from 50 to 350° C., suitably from 100 to 320° C., such as from 150 to 300° C., or from 200 to 300° C. or from 230 to 280° C., such as 250 to 280° C. or 260 to 280° C. Advantageously, it has been found that curing at higher temperatures, such as at least 240, 250, 260, or 270° C. leads to further improved properties.

The coating compositions according to the present invention may be applied to any suitable substrate. Examples of suitable substrates include, but are not limited to the following: food and/or beverage cans or components used to fabricate such cans. Examples of cans include, but are not limited to the following, two-piece cans, three-piece cans and the like. The coating compositions of the present invention may also be applied to containers for aerosol applications such as, but not limited to, deodorant and hair spray containers. Containers for aerosol applications may be monobloc aerosol cans and/or tubes, such as, for example, aluminium monobloc aerosol cans and/or tubes.

According to a further aspect of the present invention there is provided a method of preparing an acid functional polyester imide polymer having an acid value of ≥0 mg KOH/g; the method comprising the steps:
a. forming a polyester imide polymer;
b. optionally contacting the polyester imide polymer with a blocking agent, such as a mono-acid functional blocking agent;
c. contacting the polyester imide polymer with an acidifying component which may be selected from a diacid or polyacid, or esters or anhydrides thereof;
d. optionally contacting the polyester imide with titanate material and optionally a carrier.

The blocking agent may be operable to react with hydroxyl groups. The blocking agent may comprise para-tertiary-butylbenzoic acid.

The titanate material is as defined above and may be in a carrier, such as a solvent.

According to a further aspect of the present invention there is provided a metal substrate coated on at least a portion thereof with a coating, wherein the coating is derivable from a coating composition comprising:
a. a polyester imide (PEI) polymer having an acid value of 0 mg KOH/g; and
b. a crosslinker operable to crosslink the acid functionality on the polyester imide polymer
wherein the coating composition is substantially free of bisphenol A (BPA), bisphenol F (BPF), bisphenol A diglycidyl ether (BADGE) and bisphenol F diglycidyl ether (BFDGE).

According to a further aspect of the present invention there is provided a food and/or beverage container coated on at least a portion thereof with a coating, wherein the coating is derivable from a coating composition comprising:
a. a polyester imide (PEI) polymer having an acid value of ≥10 mg KOH/g; and
b. a crosslinker operable to crosslink the acid functionality on the polyester imide polymer
wherein the coating composition is substantially free of bisphenol A (BPA), bisphenol F (BPF), bisphenol A diglycidyl ether (BADGE) and bisphenol F diglycidyl ether (BFDGE).

According to a further aspect of the present invention there is provided a monobloc aerosol can and/or tube coated on at least a portion thereof with a coating, wherein the coating is derivable from a coating composition comprising:
a. a polyester imide (PEI) polymer having an acid value of ≥10 mg KOH/g; and
b. a crosslinker operable to crosslink the acid functionality on the polyester imide polymer
wherein the coating composition is substantially free of bisphenol A (BPA), bisphenol F (BPF), bisphenol A diglycidyl ether (BADGE) and bisphenol F diglycidyl ether (BFDGE).

According to a further aspect of the present invention there is provided a food and/or beverage packaging container comprising a food or beverage, wherein the packaging container is coated on at least a portion thereof with a coating, wherein the coating is derivable from a coating composition comprising:
a. a polyester imide (PEI) polymer having an acid value of ≥10 mg KOH/g; and
b. a crosslinker operable to crosslink the acid functionality on the polyester imide polymer wherein the coating composition is substantially free of bisphenol A (BPA), bisphenol F (BPF), bisphenol A diglycidyl ether (BADGE) and bisphenol F diglycidyl ether (BFDGE).

According to a further aspect of the present invention there is provided a monobloc aerosol can and/or tube comprising a cosmetic preparation, wherein the can and/or tube is coated on at least a portion thereof with a coating, wherein the coating is derivable from a coating composition comprising:
  a. a polyester imide (PEI) polymer having an acid value of ≥0 mg KOH/g; and
  b. a crosslinker operable to crosslink the acid functionality on the polyester imide polymer wherein the coating composition is substantially free of bisphenol A (BPA), bisphenol F (BPF), bisphenol A diglycidyl ether (BADGE) and bisphenol F diglycidyl ether (BFDGE).

The substrate may be formed from any suitable material. Suitable materials will be well known to a person skilled in the art. Suitable examples include, but are not limited to the following: steel; tinplate; tinplate pre-treated with a protective material such as chromium, titanium, titanate or aluminium; tin-free steel (TFS); galvanised steel, such as for example electro-galvanised steel; aluminium; aluminium alloy; and combinations thereof.

The coating compositions of the present invention may be applied to the substrate by any suitable method. Methods of applying said coating compositions to the substrate will be well known to a person skilled in the art. Suitable application methods include, but are not limited to the following: spray coating; roll coating; dipping; brushing; electrocoating; and electrostatic spraying such as, for example, ultra corona discharge.

Suitably, powder coating compositions according to the present invention may be applied to the substrate by ultra corona discharge.

When the substrate is electrically conductive, the powder coating composition is typically electrostatically applied. Electrostatic spray application generally involves drawing the coating composition from a fluidized bed and propelling it through a corona field. The particles of the coating composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited coating composition to a maximum of 250 to 300 μpm (microns), in some cases, 75 to 150 μm.

The coating compositions according to the present invention may be applied to the substrate to any suitable dry film thickness. The coating compositions according to the first aspect of the present invention may be applied to the substrate to a dry film thickness from 0.1 μm (microns) to 300 μm, suitably from 3 μm to 250 μm, such as from 5 μm to 150 μm, or even from 5 μm to 75 μm or from 5 μm to 50 μm or 5 μm to 40 μm, or from 10 μm to 30 μm, 13 μm to 23 μm or 15 μm to 21 μm.

The coating compositions of the present invention may be applied to the substrate as a single layer or as part of a multi layer system. The coating compositions of the present invention may be applied to the substrate as a single layer. The coating compositions of the present invention may be applied to the substrate as the first coat of a multi coat system. Suitably, the coating compositions of the present invention may be applied to the substrate as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The coating compositions of the present invention may be applied on top of another paint layer as part of a multi layer system. For example, the coating compositions of the present invention may be applied on top of a primer. The coating compositions of the present invention may form an intermediate layer or a top coat layer. The coating compositions of the present invention may be applied to the substrate once or multiple times. Any or all of the layers may be substantially free, essentially free or completely free of BPA, BPF and derivatives thereof.

All of the features contained herein may be combined with any of the above aspects and in any combination.

For a better understanding of the invention, and to show how embodiments of the same may be carried into effect, reference will now be made, by way of example, to the following experimental data.

EXAMPLES

Intermediate Polyester Imide Polymer A

An intermediate polyester imide polymer with predominantly hydroxyl functionality was prepared from the following ingredients and according to the procedure described below:

A total of 12.77 kilograms of ethylene glycol, 8.87 kilograms of 4,4'-methylene bis(phenyl isocyanate) and 13.63 kilograms of trimellitic anhydride were added to a suitable reaction vessel equipped with a stirrer, temperature probe, and glycol recovery setup (a packed column and a distillation head connected to a water cooled condenser) and a nitrogen sparge. The contents of the reaction vessel were heated carefully to 150° C. and then held at 150-155° C. for 4 hours whilst 1 kg of distillate was removed.

The contents of the reaction vessel were then maintained at 150-155° C. and 16.30 kilograms of tris (2-hydroxyethyl) isocyanurate, 15.22 kilograms of terephthalic acid, and 6.62 kilograms of isophthalic acid were added to the reaction mixture. The contents of the reaction vessel were heated to 235° C. with continuous removal of water distillate beginning at 169° C. The contents of the reaction vessel were held at 232-238° C. removing water as distillate until the acid value of the reaction mixture was found to be 7.0 mg KOH/gm. and the melt viscosity was 66.9 poise at 180° C.

The contents of the reaction vessel were then cooled to 200° C. before being poured out, cooled to room temperature and broken into chips. The reaction product had an acid value of 6.3 mg KOH/gm, a melt viscosity of 71 poise at 180° C. and a weight average molecular weight of 4637 as measured against a polystyrene standard.

A series of polyester ester imide polymers according to the invention were synthesised according to the formulations and procedures described below. All amounts are given in parts by weight (pbw).

Polymer B

Polyester imide polymer B was prepared from the following ingredients and according to the procedure described below:

A total of 1000 grams of Polymer A and 40 grams of trimellitic anhydride were added to a suitable reaction vessel equipped with a stirrer, temperature probe, and glycol recovery setup (a packed column and a distillation head connected to a water cooled condenser) and a nitrogen sparge. The contents of the reaction vessel were heated to 150° C. to melt the contents and then were heated to 185° C. The contents of the reaction vessel were kept at 182-188° C. with removal of a little water as distillate until the acid value of the reaction mixture was found to be 39.7 mg KOH/gm.

The contents of the reaction vessel were cooled to 170° C. before being poured out, cooled to room temperature and broken into chips. The reaction product had an acid value of 34.5 mg KOH/gm, a melt viscosity of 266 poise at 180° C., a Tg of 60.7° C., and a weight average molecular weight of 5207 as measured against a polystyrene standard.

Polymer C

Polyester imide polymer C was prepared from the following ingredients and according to the procedure as described below: A total of 1000 grams of Polymer A and 100 grams of para-tertiary-butylbenzoic acid were added to a suitable reaction vessel equipped with a stirrer, temperature probe, and glycol recovery setup (a packed column and a distillation head connected to a water cooled condenser) and a nitrogen sparge. The contents of the reaction vessel were heated to 160° C. to melt the contents and then were heated to 240° C. to with continuous removal of water as distillate. The contents of the reaction vessel were held at 240-245° C. with water removed as distillate until the acid value of the reaction mixture was found to be 13.7 mg KOH/gm.

The contents of the reaction vessel were cooled to 180° C. and 60.0 grams of trimellitic anhydride was added to the reaction mixture. The contents of the reaction vessel were kept at 178-182° C. with removal of a little water as distillate until the acid value of the reaction mixture was found to be 49.7 mg KOH/gm and the melt viscosity was 244 poise at 180° C.

The contents of the reaction vessel were then cooled to 170° C. before being poured out, cooled to room temperature and broken into chips. The reaction product had an acid value of 39.2 mg KOH/gm, a melt viscosity of 360 poise at 180° C., a Tg of 66° C., and a weight average molecular weight of 10376 as measured against a polystyrene standard.

Polymer D

A polyester imide polymer was prepared from the following ingredients and according to the procedure described below:

A total of 1000 grams of Polymer A and 100.0 grams of para-tertiary-butylbenzoic acid were added to a suitable reaction vessel equipped with a stirrer, temperature probe, and glycol recovery setup (a packed column and a distillation head connected to a water cooled condenser) and a nitrogen sparge. The contents of the reaction vessel were heated to 160° C. to melt the contents and then were heated to 210° C. with continuous removal of water as distillate. The contents of the reaction vessel were held at 208-212° C. with water removed as distillate until the acid value of the reaction mixture was found to be 16.0 mg KOH/gm.

The contents of the reaction vessel were cooled to 200° C. and 70.0 grams of adipic acid was added to the reaction mixture. The contents of the reaction vessel were kept at 198-202° C. with removal water as distillate using vacuum to promote distillation as necessary. The reaction was continued until the acid value of the reaction mixture was found to be 33.3 mg KOH/gm and the melt viscosity was 84 poise at 180° C.

The contents of the reaction vessel were cooled to 180° C. before being poured out, cooled to room temperature and broken into chips. The reaction product had an acid value of 32.1 mg KOH/gm, a melt viscosity of 92 poise at 180° C., a Tg of 51.3° C., and a weight average molecular weight of 8351 as measured against a polystyrene standard.

Polymer E

Polyester imide polymer F was prepared from the following ingredients and according to the procedure described below:

A total of 1000 grams of Polymer A and 60.0 grams of para-tertiary-butylbenzoic acid were added to a suitable reaction vessel equipped with a stirrer, temperature probe, and glycol recovery setup (a packed column and a distillation head connected to a water cooled condenser) and a nitrogen sparge. The contents of the reaction vessel were heated to 160° C. to melt the contents and then were heated to 210° C. to with continuous removal of water as distillate. The contents of the reaction vessel were held at 208-212° C. with water removed as distillate until the acid value of the reaction mixture was found to be 12.0 mg KOH/gm.

The contents of the reaction vessel were cooled to 200° C. and 95.0 grams of adipic acid was added to the reaction mixture. The contents of the reaction vessel were kept at 208-212° C. with removal water as distillate using vacuum to promote distillation as necessary. The reaction was continued until the acid value of the reaction mixture was found to be 32.8 mg KOH/gm and the melt viscosity was 408 poise at 180° C.

The contents of the reaction vessel were cooled to 200° C. before being poured out, cooled to room temperature and broken into chips. The reaction product had an acid value of 33.0 mg KOH/gm, a melt viscosity of 393 poise at 180° C., a Tg of 53.7° C., and a weight average molecular weight of 31255 as measured against a polystyrene standard.

Polymer F

Polyester imide polymer G having acid and hydroxyl functionality was prepared from the following ingredients and according to the procedure described below:

A total of 165.5 grams of 4,4'-methylene bis(phenyl isocyanate), 200.75 grams of trimellitic anhydride, 270 grams of 2-methyl 1,3 propane diol (MP diol), 106.5 grams of trimethylol propane, 224 grams of terephthalic acid, and 127.5 grams of isophthalic acid were added to a suitable reaction vessel equipped with a stirrer, temperature probe, and glycol recovery setup (a packed column and a distillation head connected to a water cooled condenser) and a nitrogen sparge. The contents of the reaction vessel were heated to 240° C. with continuous removal of water distillate beginning at 180° C. The contents of the reaction vessel were held at 240-245° C. removing water as distillate until the acid value of the reaction mixture was found to be 8.7 mg KOH/gm. Vacuum was then applied to remove the remaining water whilst the contents of the reaction vessel were held at 240-245° C. Vacuum was applied until the acid value of the reaction mixture was found to be 3.8 mg KOH/gm and the melt viscosity was 254 poise at 180° C.

The contents of the reaction vessel were maintained at 240° C. and 60 grams of adipic acid was added to the reaction mixture. The content of the reaction vessel were then held at 238-242° C. until the acid value of the reaction mixture was found to be 27.3 mg KOH/gm.

The contents of the reaction vessel were cooled to 230° C. before being poured out, cooled to room temperature and broken into chips. The reaction product had an acid value of 25.2 mg KOH/gm and a Tg of 54.6° C.

Polymer G

An acidified polyester imide polymer was prepared from the following ingredients as described below: A total of 1000 grams of Polymer A (RP-45-6747) (prepared as described above) and 100.0 grams of para-tertiary-butylbenzoic acid were added to a suitable reaction vessel equipped with a stirrer, temperature probe, and glycol recovery setup (a packed column and a distillation head connected to a water cooled condenser) and a nitrogen sparge. The contents of the reaction vessel were heated to about 160° C. to melt the contents and then were heated to 210° C. with continuous removal of water as distillate. The contents of the reaction vessel were held at 208-212° C. with water removed as distillate until the acid value of the reaction mixture was found to be 16.0 mg KOH/gm.

The contents of the reaction vessel were cooled to 200° C. and 70.0 grams of adipic acid was added to the reaction mixture. The contents of the reaction vessel were kept at 198-202° C. with removal water as distillate using vacuum to promote distillation as necessary. Reaction was continued until the acid value of the reaction mixture was found to be 39.4 mg KOH/gm and the melt viscosity was 122.5 poise at 180° C.

The contents of the reaction vessel were cooled to 180° C. and a mixture of tetra-n-butyl titanate 4.0 grams and methoxy propanol 4.0 grams, which were premixed prior to addition, were added.

The contents of the reaction vessel were stirred at 180° C. for 45 minutes before being poured out, cooled to room temperature and broken into chips. The reaction product had an acid value of 39.4 mg KOH/gm, a melt viscosity of 94.5 poise at 180° C.

Polymer H

An acidified polyester imide polymer was prepared from the following ingredients as described below: A total of 1000 grams of Polymer A (RP-45-6747) (prepared as described above) and 100 grams of para-tertiary-butylbenzoic acid were added to a suitable reaction vessel equipped with a stirrer, temperature probe, and glycol recovery setup (a packed column and a distillation head connected to a water cooled condenser) and a nitrogen sparge. The contents of the reaction vessel were heated to about 160° C. to melt the contents and then were heated to 240° C. to with continuous removal of water as distillate. The contents of the reaction vessel were held at 240-245° C. with water removed as distillate until the acid value of the reaction mixture was found to be 14.7 mg KOH/gm.

The contents of the reaction vessel were cooled to 180° C. and 60.0 grams of trimellitic anhydride was added to the reaction mixture. The contents of the reaction vessel were kept at 178-182° C. with removal of a little water as distillate until the acid value of the reaction mixture was found to be 47.9 mg KOH/gm and the melt viscosity was 180.2 poise at 180° C.

The contents of the reaction vessel were cooled to 170° C. and a mixture of tetra-n-butyl titanate 20.0 grams and methoxy propanol 20.0 grams, which were premixed prior to addition were added.

The contents of the reaction vessel were then poured out, cooled to room temperature and broken into chips. The reaction product had an acid value of 46.6 mg KOH/gm, a melt viscosity of 163.5 poise at 180° C.

Coating Composition Examples 1 to 7

Inventive coating compositions 1 to 7 and comparative coating composition 1 were prepared according to the formulations in Table 1. All amounts are given in parts by weight (pbw).

TABLE 1

| Raw material | Composition 1 | Composition 2 | Composition 3 | Composition 4 | Composition 5 | Composition 6 | Composition 7 | Comparative Composition 1 |
|---|---|---|---|---|---|---|---|---|
| Polymer B | 94.34 | | | | | | | |
| Polymer C | | 69.74 | | | | | | 69.74 |
| Polymer D | | | 69.74 | | | | | |
| Polymer E | | | | 69.74 | | | | |
| Polymer F | | | | | 69.74 | | | |
| Polymer G | | | | | | 69.35 | | |
| Polymer H | | | | | | | 69.35 | |
| Resiflow PV 5[1] | 1.12 | 1.12 | 1.12 | 1.12 | 1.12 | | | 1.12 |
| Pigment[2] | 9.78 | 9.78 | 9.78 | 9.78 | 9.78 | 9.71 | 9.71 | 9.78 |
| Hydroxyalkylamide crosslinker[3] | 4.18 | 4.18 | 4.18 | 4.18 | 4.18 | 4.16 | 4.16 | 0.00 |
| Filler[4] | 13.95 | 13.95 | 13.95 | 13.95 | 13.95 | 13.87 | 13.87 | 13.95 |
| Byk-366P[5] | 1.23 | 1.23 | 1.23 | 1.23 | 1.23 | | | 1.23 |
| Byk-3950P[6] | | | | | | 0.97 | 0.97 | |
| Byk-3900[7] | | | | | | 0.97 | 0.97 | |
| Ceraflour 961[8] | | | | | | 0.97 | 0.97 | |
| Aerosil 200[9] | 0.30 | 0.30 | 0.30 | 0.30 | 0.30 | 0.30 | 0.30 | 0.30 |

[1]Resiflow PV 5 is a flow agent available from Estron Chemical
[2]TiONa 595 is a titanium dioxide pigment available from CRISTAL
[3]Primid XL552 is available from Rohm and Haas
[4]Blanc Fix Micro is available from Sachtleben Chemie GmbH
[5,6,7,8]Byk-366P, Byk-3950P, Byk-3900 and Ceraflour 961 are each available from BYK-Chemie
[9]Aerosil 200 is available from Evonik

Test Methods

Test panel preparation: The coating samples were applied onto aluminium panels monobloc cans. 1-2 grams of coating compositions 1-7 were applied individually onto aluminium panels by electro-static spray using a Corona high voltage application gun. Subsequently, the panel was placed in a convection oven to be cured for 4 minutes at a temperature as shown in Tables 3 and 4. Test can preparation: some chosen samples of coating composition 2, 3, 6 and comparative coating compositions 1-4 were applied into aluminium cans by electro-static spray using a Corona high voltage application gun. Each can contains between 0.6-1.2 grams. Subsequently, the cans were placed in a convection oven to be cured for 4 minutes at a temperature as shown in Tables 5-8.

The coated panels were tested for coating thickness, direct and reverse impact test, cross hatch adhesion, cross cut adhesion, blush, discolouration, scratch resistance, crazing after folding and adhesion after folding after exposure to boiling water and solvent. The coated cans were tested for coating thickness, enamel rating after the impact test, also known as the falling weight test, cross hatch adhesion, cross cut adhesion, blush, discolouration, scratch resistance, crazing after folding and adhesion after folding after exposure to boiling water and after exposure to deodorant, styling mousse, shaving foam or hairspray according to the procedures described below.

Coating thickness: Coating thickness was measured according to a non-destructive measurement of anodic coatings applied onto an aluminium base, using an ISOSCOPE MP30, coating thickness measuring instrument. The uncoated aluminium panel and can was used for calibration after it had been flattened. The thickness of the coating of the coated cans was measured both on the side wall and on the bottom of the can. The measured thickness was reported in microns and represented either the average of 10 measurements or the lowest and highest values.

Impact Test: The impact test was carried out according to ASTM D2794. The coated side of the panel facing up (direct) and down (reverse) on a metal fixture. A 1 kg weight is dropped from a 60 cm height to strike an indentation. The bottom part of the coated can was cut at a height of 20 mm and then with the coated side facing down on a Teflon coated fixture. A 1 kg weight is dropped from a 1 meter height to strike an indentation. The integrity of the coating was measured using a WACO Enamel Rater Instrument and a 1% salt solution containing 0.1% dioctyl sodium sulfosuccinate and reported in milliamperes (mA).

MEK rub test: 100 reciprocating rubs were carried out using a ball of cotton wool soaked in methyl ethyl ketone (MEK). The coated parts of panels or cans were then tested for scratch resistance, discolouration, crazing after folding and adhesion after folding. The test methods are described in [233]-[238]. After the 100 reciprocating rubs were carried out the cotton wool is checked for colouration.

Boiling water tests: The coated parts of the panel and can were immersed in boiling demineralised water at 100° C. for 15 minutes and subsequently removed and dried. They were then tested for cross cut adhesion, cutting edge adhesion, blush, discolouration, scratch resistance, crazing after folding and adhesion after folding.

Cross cut adhesion was measured according to the DIN ISO 2409 standard. Briefly, a crosshatch grid was made in the film using a grid comb and was then covered with tape (grade TESA 4104 clear). Within 60 seconds of its application, the tape was removed rapidly. The grid area is then checked for removal of the coating from the substrate. The adhesion was scored in accordance with the following scale:

0: The edges of the cuts are completely smooth; none of the squares of the grid are detached.

1: Small flakes of the coating are detached at intersections; less than 5% of the area is affected.

2: Some flakes of the coating are detached along the edges and/or at intersections of the incisions. The area affected is 5-15% of the grid.

3: The coating has peeled along the edges and on parts of the squares of the grid. The area affected is 15-35% of the grid.

4: The coating has peeled along the edges of the incisions in large strips and some squares are totally detached. The area affected is 35-65% of the grid.

5: All degrees of peeling and flecking that can be not classified under 4.

Cutting edge adhesion was measured by the following method. The coated parts of the panel and can were cut along the length of the panel and can using scissors. The cutting edge adhesion was evaluated according to the level of peeling from the substrate and using a rating of 1-5, with 5 being the best.

Blush was measured by the following method. The coated parts of the tested panel and can were compared with the untested control sample. The blush was evaluated by using a rating of 1-5, with 5 being the best.

Discolouration was measured by the following method. The coated parts of the tested panel and can were compared with the untested control sample. The discoloration was evaluated by using a rating of 1-5, with 5 being the best.

Scratch resistance was measured by the following method. A sharp-edged plastic device was moved along the panel and can surface at an angle of 45°. The scratch resistance was evaluated according to the level of peeling from the substrate and using a rating of 1-5, with 5 being the best.

Crazing after folding was measured by the following method. The coated parts of the panel and can were folded by an angle of 180°. The folded area was then inspected visually. The crazing was evaluated by using a rating of 1-5, with 5 being the best.

Adhesion after folding was measured by the following method. The coated parts of the panel and can were folded by an angle of 180°. The folded area was scratched by hand. The adhesion was evaluated by using a rating from 1-5, with 5 being the best.

Pack performance was measured by the following method. The coated cans were cut into stripes and put in cans which acted as test containers. After sealing the can with a valve the original filling good was transferred. The cans were stored for 1 week at 55° C. plus 4 weeks at 45° C. After storage the cans were opened and the coated stripes were immediately tested for cutting edge adhesion, blush, discolouration, scratch resistance, crazing after folding, scratch resistance after folding and blistering. The test methods were described in [233]-[238].

Blistering was measured by the following method. The coated stripes were compared with the untested control sample. The blistering was evaluated by using a rating of 1-5, with 5 being the best.

TABLE 2

Tests on aluminium panels from Müller & Bauer
Flexibility (check crazing, cracks after impact)

| | Comp. 1 | Comp. 2 | Comp. 3 | Comp. 4 | Comp. 5 | Comp. 6 | Comp. 7 | Com. Comp 1 |
|---|---|---|---|---|---|---|---|---|
| Curing condition 4'230° C. | | | | | | | | |
| Film thickness, μm | 11-15 | 11-16 | 12-16 | 16-17 | 18-27 | 19-33 | 17-26 | 10-19 |
| direct impact | 5 | 3 | 5 | 5 | 5 | 3 | 3 | 1 |
| reverse impact | 2 | 2 | 2 | 5 | 2 | 3 | 3 | 1 |
| Curing condition 4'250° C. | | | | | | | | |
| Film thickness, μm | 15-19 | 17-25 | 15-23 | 17-29 | 22-24 | 20-28 | 15-22 | 16-28 |
| direct impact | 4 | 3 | 3 | 3 | 3 | 5 | 5 | 1 |
| reverse impact | 4 | 3 | 3 | 3 | 3 | 5 | 5 | 1 |
| Curing condition 4'270° C. | | | | | | | | |
| Film thickness, μm | 14-21 | 7-14 | 18-22 | 15-21 | 10-30 | 13-21 | 13-22 | 15-23 |
| direct impact | 4 | 4 | 3 | 5 | 5 | 5 | 5 | 3 |
| reverse impact | 4 | 4 | 3 | 5 | 5 | 5 | 5 | 3 |

Flexibility evaluation
5 excellent
4 few cracks
3 cracks coating starts to flake off the
2 substrate
1 coating flakes off the substrate

TABLE 3

MEK resistance

| | Comp. 1 | Comp. 2 | Comp. 3 | Comp. 4 | Comp. 5 | Comp. 6 | Comp. 7 | Com. Comp. 1 |
|---|---|---|---|---|---|---|---|---|
| MEK resistance Curing condition 4'230° C. | | | | | | | | |
| Film thickness, μm | 11-15 | 11-16 | 12-16 | 16-17 | 18-27 | 19-33 | 17-26 | 10-19 |
| DR | 100 | 100 | 100 | 100 | 100 | 100 | 100 | 50 |
| Scratches/abrasion | 4 | 4 | 3 | 3.5 | 3 | 4.5 | 5 | no coating left after 50 DR |
| Discoloration of coating | 4.5 | 4.5 | 4 | 4.5 | 5 | 4.5 | 5 | |
| Coloration of cotton | 5 | 4.5 | 4.5 | 5 | 4 | 5 | 5 | |
| Folding | 5 | few cracks | 5 | few cracks | 5 | 3.5 | 3.5 | |
| Adhesion after folding | 5 | 4 | 4 | 4.5 | 3 | 5 | 4 | |
| MEK resistance Curing condition 4'250° C. | | | | | | | | |
| Film thickness, μm | 15-19 | 17-25 | 15-23 | 17-29 | 22-24 | 20-28 | 15-22 | 16-28 |
| DR | 100 | 100 | 100 | 100 | 100 | 100 | 100 | 100 |
| Scratches/abrasion | 4 | 4 | 4 | 4 | 3 | 5 | 5 | 2 |
| Discoloration of coating | 5 | 5 | 5 | 5 | 4.5 | 5 | 5 | 2 |
| Coloration of cotton | 5 | 5 | 5 | 5 | 4 | 5 | 5 | 1 |
| Folding | Few cracks | 5 | 5 | 5 | 5 | 4.5 | 5 | 2 |
| Adhesion after folding | 5 | 5 | 5 | 5 | 5 | 5 | 5 | 2 |
| MEK resistance Curing condition 4'270° C. | | | | | | | | |
| Film thickness, μm | 14-21 | 7-14 | 18-22 | 15-21 | 10-30 | 13-21 | 13-22 | 15-23 |
| DR | 100 | 100 | 100 | 100 | 100 | 100 | 5 | 100 |
| Scratches/abrasion | 4 | 4 | 4 | 5 | 5 | 5 | 5 | 4 |
| Discoloration of coating | 5 | 4.5 | 5 | 5 | 4.5 | 5 | 5 | 4 |
| Coloration of cotton | 5 | 5 | 5 | 5 | 5 | 5 | 5 | 4 |
| Folding | 5 | 5 | 5 | 5 | 5 | 5 | 5 | 5 |
| Adhesion after folding | 5 | 5 | 5 | 5 | 5 | 5 | 5 | 5 |

Evaluation: 5 = excellent; 0 = very poor

TABLE 4

Boiling tests
Boiling tests (15' @ 100° C. in demineralized water)

| | Comp. 1 | Comp. 2 | Comp. 3 | Comp. 4 | Comp. 5 | Comp. 6 | Comp. 7 | Com. Comp. 1 |
|---|---|---|---|---|---|---|---|---|
| Curing condition 4'230° C. | | | | | | | | |
| Film thickness, μm | 11-15 | 11-16 | 12-16 | 16-17 | 18-27 | 19-33 | 17-26 | 10-19 |
| Cross-hatch-test | 4 | 4 | 5 | 5 | 4.5 | 5 | 4 | 2.5 |
| Scratch resistance | 5 | 5 | 5 | 5 | 5 | 5 | 5 | 4 |
| Cut-edge-adhesion | 3.5 | 4 | 5 | 4.5 | 4.5 | 5 | 4 | 2 |
| Crazing after folding | 3 | 3 | 3 | 3.5 | 4 | 3 | 3.5 | 3 |
| Scratch resistance after folding | 3 | 3.5 | 3.5 | 3.5 | 4 | 4 | 3 | 2 |
| Blush | 3.5 | 4 | 4 | 3.5 | 3 | 5 | 5 | 1 |
| Discoloration | 3.5 | 4 | 3 | 3.5 | 3 | 2 | 4 | 1 |
| Curing condition 4'250° C. | | | | | | | | |
| Film thickness, μm | 15-19 | 17-25 | 15-23 | 17-29 | 22-24 | 20-28 | 15-22 | 16-28 |
| Cross-hatch-test | 5 | 4.5 | 5 | 5 | 5 | 5 | 4 | 2.5 |
| Scratch resistance | 5 | 5 | 5 | 5 | 5 | 5 | 5 | 5 |
| Cut-edge-adhesion | 5 | 5 | 5 | 5 | 5 | 5 | 4 | 3.5 |
| Crazing after folding | 3 | 3 | 4.5 | 5 | 5 | 5 | 4 | 2 |
| Scratch resistance after folding | 5 | 3.5 | 5 | 5 | 5 | 5 | 5 | 2 |
| Blush | 4 | 4 | 3.5 | 4 | 4 | 5 | 5 | 2.5 |
| Discoloration | 3 | 3 | 3.5 | 3.5 | 3.5 | 4 | 5 | 2 |
| Curing condition 4'270° C. | | | | | | | | |
| Film thickness, μm | 14-21 | 7-14 | 18-22 | 15-21 | 10-30 | 13-21 | 13-22 | 15-23 |
| Cross-hatch-test | 5 | 5 | 4.5 | 4.5 | 5 | 4.5 | 5 | 4.5 |
| Scratch resistance | 5 | 5 | 5 | 5 | 5 | 5 | 5 | 5 |
| Cut-edge-adhesion | 5 | 5 | 5 | 5 | 5 | 5 | 4 | 5 |
| Crazing after folding | 4.5 | 5 | 4.5 | 5 | 5 | 5 | 4.5 | 3 |
| Scratch resistance after folding | 5 | 5 | 5 | 5 | 5 | 5 | 5 | 5 |
| Blush | 4.5 | 4 | 4.5 | 4 | 4.5 | 5 | 5 | 3 |
| Discoloration | 4 | 4.5 | 4.5 | 4 | 4 | 4.5 | 5 | 3 |

Evaluation: 5 = excellent; 0 = very poor

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A food and/or beverage container coated on at least a portion thereof with a coating, wherein the coating is derived from a coating composition comprising:
   a. a polyester imide (PEI) polymer having an acid value of ≥10 mg KOH/g; and
   b. a crosslinker comprising a hydroxyalkyl amide, a hydroxyalkyl urea and/or a carbodiimide;
   wherein the coating composition is substantially free of bisphenol A (BPA), bisphenol F (BPF), bisphenol A diglycidyl ether (BADGE) and bisphenol F diglycidyl ether (BFDGE).

2. The food and/or beverage container according to claim 1, wherein the polyester imide (PEI) polymer is formed from an imide containing moiety.

3. The food and/or beverage container according to claim 2, wherein the imide containing moiety contains a cyclic imide group.

4. The food and/or beverage container according to claim 1, wherein the polyester imide polymer has a Tg from 40° C. to 70° C.

5. The food and/or beverage container according to claim 1, wherein the coating composition is a thermoset powder coating composition.

6. The food and/or beverage container according to claim 1, wherein the coating composition comprises a titanate material.

7. The food and/or beverage container according to claim 6, wherein the titanate material comprises titanate substituted with organic groups, each independently selected from methyl, ethyl, n-propyl, isopropyl, n-butyl, tbutyl, pentyl, hexyl, cyclohexyl.

8. The food and/or beverage according to claim 6, wherein the titanate material is present in the coating composition in an amount of 0.1-10 wt % (based on the dry weight of the coatings ingredients).

9. A monobloc aerosol can and/or tube coated on at least a portion thereof with a coating, wherein the coating is derived from a coating composition comprising:
   a. a polyester imide (PEI) polymer having an acid value of ≥10 mg KOH/g; and
   b. a crosslinker comprising a hydroxyalkyl amide, a hydroxyalkyl urea and/or a carbodiimide;
   wherein the coating composition is substantially free of bisphenol A (BPA), bisphenol F (BPF), bisphenol A diglycidyl ether (BADGE) and bisphenol F diglycidyl ether (BFDGE).

10. The monobloc aerosol can and/or tube according to claim 9, wherein the polyester imide (PEI) polymer is formed from an imide containing moiety.

11. The monobloc aerosol can and/or tube according to claim 10, wherein the imide containing moiety contains a cyclic imide group.

12. The monobloc aerosol can and/or tube according to claim 9, wherein the polyester imide polymer has a Tg from 40° C. to 70° C.

13. The monobloc aerosol can and/or tube according to claim 9, wherein the coating composition is a thermoset powder coating composition.

14. The monobloc aerosol can and/or tube according to claim 9, wherein the coating composition comprises a titanate material.

15. The monobloc aerosol can and/or tube according to claim 14, wherein the titanate material comprises titanate substituted with organic groups, each independently selected from methyl, ethyl, n-propyl, isopropyl, n-butyl, t-butyl, pentyl, hexyl, cyclohexyl.

16. The monobloc aerosol can and/or tube according to claim 14, wherein the titanate material is present in the coating composition in an amount of between 0.1-10 wt % (based on the dry weight of the coatings ingredients).

17. The food and/or beverage container according to claim 1, wherein the coating composition comprises a weight ratio of the polyester imide polymer (a) to the crosslinker (b) from 50:1 to 1:10.

18. The monobloc aerosol can and/or tube according to claim 9, wherein the coating composition comprises a weight ratio of the polyester imide polymer (a) to the crosslinker (b) from 50:1 to 1:10.

19. The food and/or beverage container of claim 1, wherein the crosslinker comprises a hydroxyalkyl amide having a terminal chemical group of Formula I

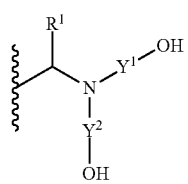

Formula I where $R^1$ is an electron withdrawing group and $Y^1$ and $Y^2$ each, independently, are a C1 to C3 alkylene group and the terminal chemical group is attached to a further chemical structure or a carrier substrate; and/or the formula of Formula II

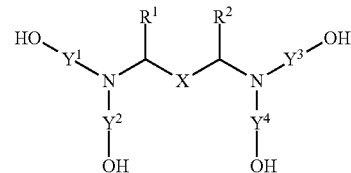

where $R^1$ and $R^2$ are independently an electron withdrawing group; $Y^1$ to $Y^4$ are independently a C1 to C3 alkylene group; and X is a C2 to C6 alkylene group.

20. The monobloc aerosol can and/or tube of claim 9, wherein the crosslinker comprises a hydroxyalkyl amide having a terminal chemical group of Formula I

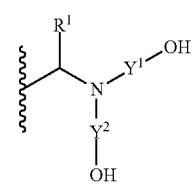

Formula I where $R^1$ is an electron withdrawing group and $Y^1$ and $Y^2$ each, independently, are a C1 to C3 alkylene group and the terminal chemical group is attached to a further chemical structure or a carrier substrate; and/or the formula of Formula II

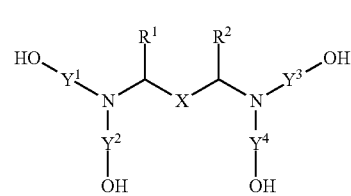

Formula II where $R^1$ and $R^2$ are independently an electron withdrawing group; $Y^1$ to $Y^4$ are independently a C1 to C3 alkylene group; and X is a C2 to C6 alkylene group.

21. The food and/or beverage container according to claim 1, wherein the dry film thickness is 5 to 40 microns.

22. The food and/or beverage container according to claim 21, wherein the dry film thickness is 10 to 30 microns.

23. The monobloc aerosol can and/or tube according to claim 9, wherein the dry film thickness is 5 to 40 microns.

24. The monobloc aerosol can and/or tube according to claim 23, wherein the dry film thickness is 10 to 30 microns.

* * * * *